(12) United States Patent
Dinauer et al.

(10) Patent No.: US 6,850,812 B2
(45) Date of Patent: Feb. 1, 2005

(54) CONTROLLER FOR A LASER USING PREDICTIVE MODELS OF MATERIALS PROCESSING

(75) Inventors: William R. Dinauer, Hudson, WI (US); Thomas V. Weigman, Forest Lake, MN (US)

(73) Assignee: LasX Industries, Inc., White Bear Lake, MN (US)

( * ) Notice: Subject to any disclaimer, the term of this patent is extended or adjusted under 35 U.S.C. 154(b) by 0 days.

(21) Appl. No.: 10/063,191

(22) Filed: Mar. 28, 2002

(65) Prior Publication Data

US 2002/0198622 A1 Dec. 26, 2002

Related U.S. Application Data

(60) Provisional application No. 60/280,270, filed on Mar. 29, 2001.

(51) Int. Cl.[7] .............................................. G06F 17/00
(52) U.S. Cl. ...................... 700/166; 700/90; 700/159; 700/28
(58) Field of Search ............................ 700/28, 160, 90, 700/145, 159, 166, 29–32; 219/121.68, 121.69

(56) References Cited

U.S. PATENT DOCUMENTS

| | | | |
|---|---|---|---|
| 5,428,559 A | 6/1995 | Kano | |
| 5,519,605 A | 5/1996 | Cawlfield | |
| 5,535,128 A | 7/1996 | Laube et al. | |
| 5,740,033 A | 4/1998 | Wassick et al. | |
| 5,880,430 A | * 3/1999 | Wein | 219/121.69 |
| 5,990,444 A | 11/1999 | Costin | |
| 6,172,325 B1 | * 1/2001 | Baird et al. | 219/121.62 |
| 6,177,648 B1 | 1/2001 | Lawson | |

FOREIGN PATENT DOCUMENTS

| | | |
|---|---|---|
| EP | 0 997 841 | 5/2000 |
| EP | 1 085 624 | 3/2001 |
| JP | 11-296204 | 10/1999 |

OTHER PUBLICATIONS

W. Dinauer, Laser processing module (LPM) specification outline, May 15, 1998.
W. Dinauer, Laser project exodus, Jun. 2, 1998.
T. Weigman, Laser project foresight™, May 25, 1999.
LasX Industries, Inc. web site, www.lasxindustries.com, Aug. 2000.
Laser Machine Tool, LaserShartp® Digital Converting brochure, 1999, LasX Industries, Inc.
"An introduction to laser digital converting for label production," Labels & Labeling, Jan./Feb. 2000, LasX Industries, Inc.

(List continued on next page.)

Primary Examiner—Jayprakash N. Gandhi
(74) Attorney, Agent, or Firm—Fish & Richardson P.C.

(57) ABSTRACT

Predictive models of physical parts of the laser processing system part determined. These predictive models are used to determine how the physical system will actually react. The predicted reaction from the models is used as feedback in order to produce the control signals. These physical models therefore adjust to the operation of the system, much in the way that actual feedback would adjust the operation of the system. However, the system may be used at faster speeds, where the actual feedback could not be produced fast enough. Different kinds of modeling are described, including in-position feedback which models sharp movements of the laser system, trajectory models which superimpose the commanded curve over the predicted actual curve to determine errors in trajectory, and constant/variable energy density controls.

21 Claims, 25 Drawing Sheets

OTHER PUBLICATIONS

OEM Manual pp. 4–3 to 4–7 for Diamond K–500/K–400 Laser, Coherent Laser Group, Santa Clara, CA.

Laser Marking Software, www.laserware.com website, Aug. 2000, American Laserware, Winter Park, FL.

Users Guide ScOpticModuleCtrl Version 1.10, pp. 8–9, 1998, SCAPS, Munich Germany.

HC/2™ and HC/X M–S™ Reference Manual, pp. 11–12, 1997, General Scanning, Watertown, MA.

Job Editor Instruction Manual, pp. 23–25, 1998, General Scanning, Watertown, MA.

PC Real Time Control Board TRC2, pp. 2–12, 1999, ScanLab AG, Munich Germany.

"Laser die cutting makes its mark at Wave Front," Labels & Labeling, Jun./Jul. 200, Wave Front Technologies, Irvine CA.

SoftDie The Dienamic Digital Difference, www.wavefront-tech.com web site, Aug. 2000.

"Laser Integration: A High Speed Productivity Boom for the Screen Printing Industry," SGIA 3Q00 Journal, Laser Machining, Inc., Somerset WI.

Galvanometer scanning products, PowerScan33, PowerScan 70 and VarioScan40/80, ScanLab AG, Munich Germany.

Galvanometer Scanner Actuator, Cambridge Technology, Cambridge MA.

Galvanometer and Resonant Scanner Actuators, General Scanning, Watertown MA.

Resonant and Polygon Scanner Actuators, Electro–Optical Products Corporation, Fresh Meadows NY.

Voice Coil Actuators, BEI Kimco Magnetics Division, San Marcos CA.

Linear Motor Actuators, Trilogy Systems Corporation, Webster TX.

* cited by examiner

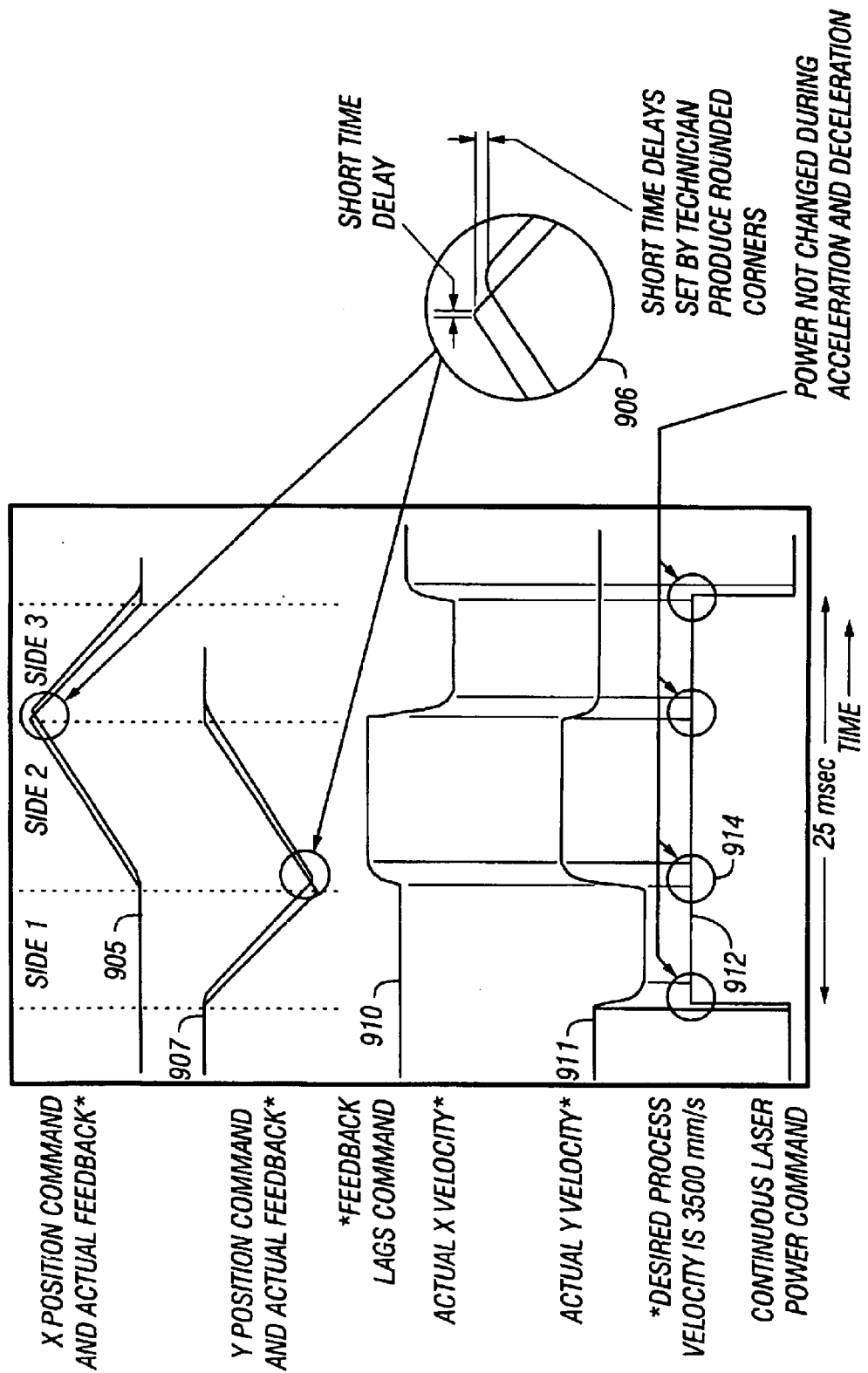

CONTROLLER FOR A LASER USING PREDICTIVE MODELS OF MATERIALS PROCESSING

CROSS REFERENCE TO RELATED APPLICATIONS

This application claims benefit of U.S. Provisional Application No. 60/280,270, filed Mar. 29, 2001.

BACKGROUND OF INVENTION

Modern numerically controlled laser elements, and other machine controlled laser elements, may process materials at very high rates. The process velocity may be defined as the relative velocity that exists between the laser beam and the material being processed. It is desirable to make sure that the laser is processing the material in the desired way.

However, the state-of-the-art of monitoring devices may not be able to accurately monitor such processes at these high process velocities. The sensors or feedback elements that currently exist are not sufficiently accurate to monitor these operations. Accordingly, prior art devices have often used highly trained technicians to set up and operate the process. These highly trained technicians are often very expensive. Even when such highly trained technicians are used, it still may be relatively difficult to monitor and accurately control the laser materials process.

Some processes, such as scribing grayscale patterns, and other processes which occur at even higher performance rates such as 20,000 mm/second of process velocity, may not be achievable at all with existing controllers. Scribing of such a grayscale pattern may involve varying the laser energy density at precise locations on the process material. The changes in laser power command may correspond to changes in the grayscale pattern intensity. However, when this operation is occurring at very high process velocities, it may be difficult to compensate for the inherent delay that exists between the reaction of the physical system and the control elements to that physical system.

Similarly, position-based perforation requires the laser energy to be adjusted in order to form holes or slots in the material at specific locations and at precise intervals. Again, the existing controllers may not be able to adequately handle these applications.

SUMMARY OF INVENTION

The present system recognizes that even though the sensors may not be sufficiently accurate to monitor certain fast operations, the system may act in a repeatable way. Any physical system may have dynamic position and velocity errors that effect the accuracy and quality of the process. There are also certain non desirable characteristics of laser resonator and laser optics and process materials may also impact the process.

The present system teaches a system which models characteristics of different parts of a system. The characteristics of the system, as modeled, may then be used to predict how the system will act in the different situations. The prediction of actions may then be used to control and synchronize the operation of the system.

BRIEF DESCRIPTION OF DRAWINGS

FIGS. 9A–9G show an example using controlled depth cutting,

DETAILED DESCRIPTION

Figure 1:
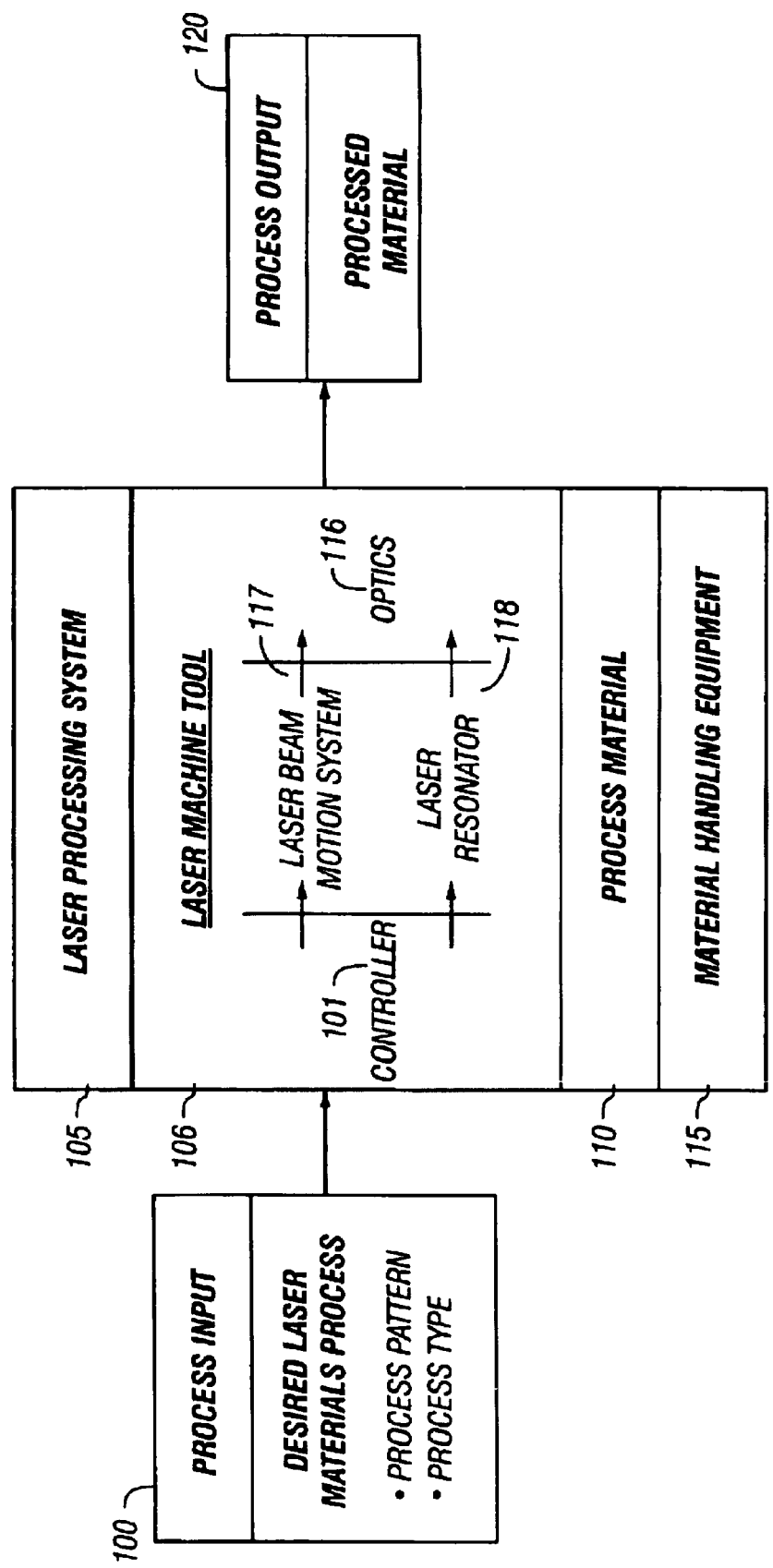
FIG. 1 shows a system of laser material processing.

A block diagram of the overall system is shown in FIG. 1. Process input 100 may include the parameters which define the kind of process material and pattern that is going to be formed. For example, the process input may include the "process pattern", which may be a computer file that represents the patterns to be formed on the material. It may also include "process type" which indicates what is going to be done by the laser. Process type may include the different materials processes the laser may carry out, including cutting, scoring, perforating, scribing, "kiss cutting", and the like.

In this environment, the laser processing is preferable for processing of nonmetallic materials. However, the present system also has application to metallic materials, in which case the process type may include operations to be carried out on metals, such as welding, surface treatment including heat treating, and other type processes.

The process input at 100 is used by the controller 101 to control the laser processing system 105 and all its subsystems. The laser processing system 105 includes the actual laser machine tool shown as 106. This includes, as conventional, the laser beam motion system 117 including the focus actuator, the actual laser resonator 118 that produces the laser beam, the optics 116 of the laser beam, and the controller 101 itself. The laser processing system also includes the process material 1110 which corresponds to the material being processed, as well as the material handling equipment 115. The material handling equipment may include the equipment that is used to guide the material 110 into the area of the laser beam and finally to the output.

The process material is shown as 120. Common process materials may include papers, plastics, textiles, metals, composites, and other materials. Process types may include cutting, scribing, perforating, scoring, welding, and surface treatment. The material handling equipment 115, if used, conveys the process material through the laser machine tool.

Figure 2:
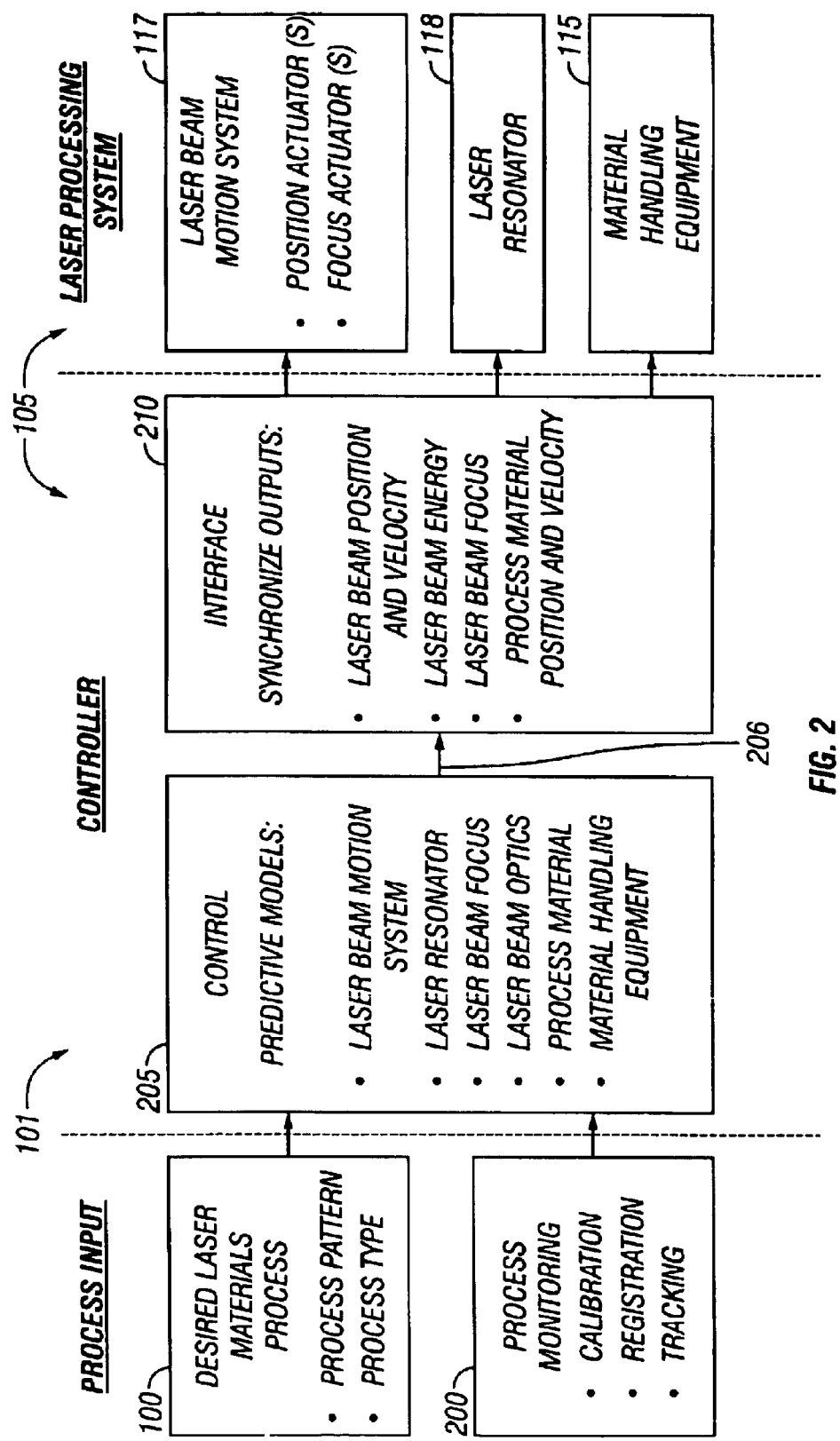
FIG. 2 shows a block diagram with further detail on the laser process.

A more detailed block diagram of the embodiment is shown in FIG. 2. The process input 100 and a process monitoring block 200 form inputs to controller 101. The process monitoring 200 may include data from any sensors and other feedback elements. For example, the process monitoring may be used for calibration of process elements and registration and tracking of process material. These actual data values may be input to the model that is executed as part of the controller.

Controller 101 is shown in further detail as including a control 205 and an interface 210. The control 205 may store predictive models and associated control functions that may be used as described herein. Control 205 may be resident in hardware, software, or programmable logic, or any combination thereof. The predictive models may include aspects of the material processing system, laser beam motion system, laser beam resonator, laser beam focus, laser beam optics, process material including characteristics of the material, and the material handling equipment. While these are the preferred predictive models, other models may also be included. The output of the control is shown as 206, and may represent a solution of the merged models as it influences the quality, accuracy, and velocity of the actual laser beam and material process being controlled. The output 206 is coupled to the interface 210.

The interface 210 may vary and synchronize the outputs for laser beam position and velocity, laser beam energy density, laser beam focus, the position and velocity of the process material and characteristics of the process material. These outputs may coupled to the laser processing system 105. The specific outputs may be coupled to a laser beam motion system 117 which may include position actuators and focus actuator, the laser resonator 118 and the material handling equipment 115 as shown.

Figure 3A:
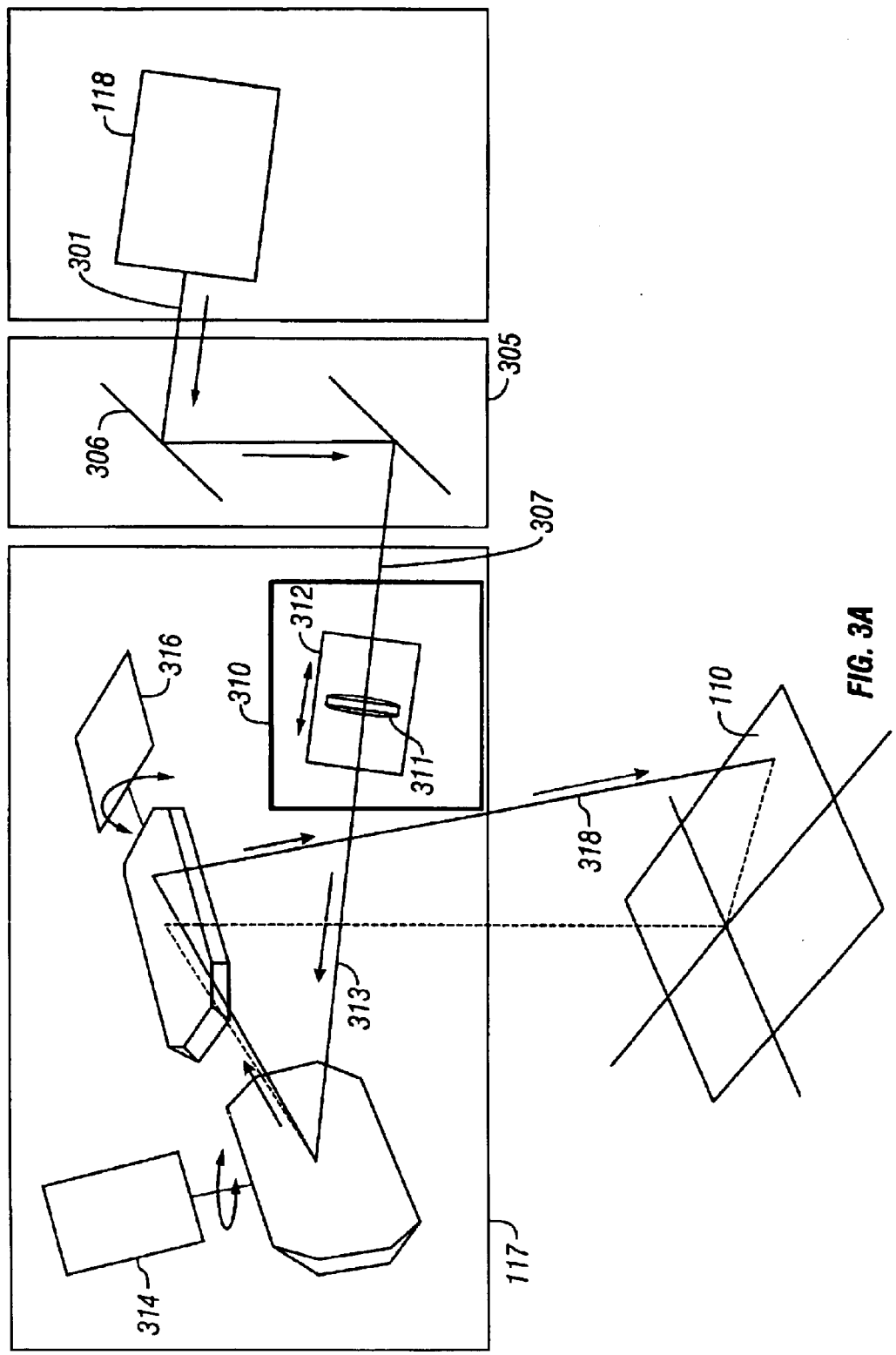
FIG. 3A shows a laser beam motion system and its various components.

One design of an actual laser beam motion system 117 is shown in FIG. 3A. The resonator 118 creates a laser beam 301 which is passed through laser beam changing optics 305 which may include the first beam changing optics 306. The output beam 307 is coupled to focusing element 310 which may include a lens 311 on a movable mechanism driven by a motor actuator 312. The focused laser beam 313 is coupled to a galvanometer motor actuator pair, including a first direction galvanometer 314 and a second direction galvanometer 316. These two galvanometers pivot in mutually exclusive directions. The output laser beam 318 is coupled to the process material 110.

The predictive model of the motion system operates by obtaining a mathematical model of the way the output reacts as compared with the command. FIG. 38 shows a graph of position versus time for the commanded position and predicted position of one such motion system. For example, the commanded position may be represented by the graph 350. At each of a plurality of commanded positions at specific times, shown as the variable $m_a$, the predicted position may be the position $C_a$ shown on the graph 355. For example, the commanded position $m_{a\ n}$ may actually have the predicted position $C_{a\ n}$. The "lag" is represented by the parameters 356 in distance and 357 in time, both of which represent the differences between the commanded position and the predicted position.

Specifically, this can be modeled as:

Actuator Model Inputs:

a = motion system actuator (x, y, z, . . . )
$\beta_a$ = actuator bandwidth (Hz)
$d_a$ = actuator delay (Integer multiple of update period)
Control Inputs:

T = update period for each control cycle (sec)
n = update series number (number in sequential series of update periods)
$R_a$ = desired position vector (mm)
$m_{a_n}$ = microvector position command (mm), modified by Control Functions and process material position
Predictive Model Outputs:

$c_{a_n}$ = predicted position feedback (mm)
Predictive Feedback Model of each
Actuator in a Laser Beam Motion System:

$$C_{a_n} = \delta_a C_{a_{(n-1)}} + (1 - \delta_a) m_{a_{(n-1-d_e)}}$$

where, $\tau_d = 1/(2\pi\beta_a)$   actuator time constant
$\delta_a = e^{-T_{k_a}}$
n = 0, 1, 2, 3, ...

Figure 3B:
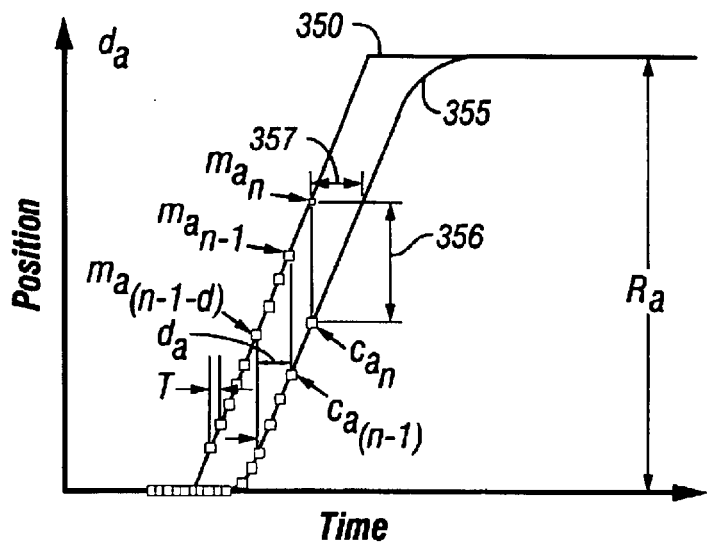
FIG. 3B shows an example of the predicted position model for a laser beam motion systems.

These specific equations may correspond to a first order predictive model of the laser beam motion system. Such a model shown in FIG. 3B is a first order with delay model for a galvanometer motor actuator. These models may be readily found in machine and process control literature. Similar models may be applied to other beam motion actuators and beam focus actuators. While the present description describes first order models being used, it should be understood that more complex models can also be used.

In operation, these and other predictive models may be used to make the system operate in the desired way. For example, if a sharp corner needs to be cut at a constant depth on the process material, the models may be used to reduce motion system velocity near that corner. The laser power may be correspondingly reduced near the corner. This enables cutting a sharp corner at a constant cut depth.

Figure 4:
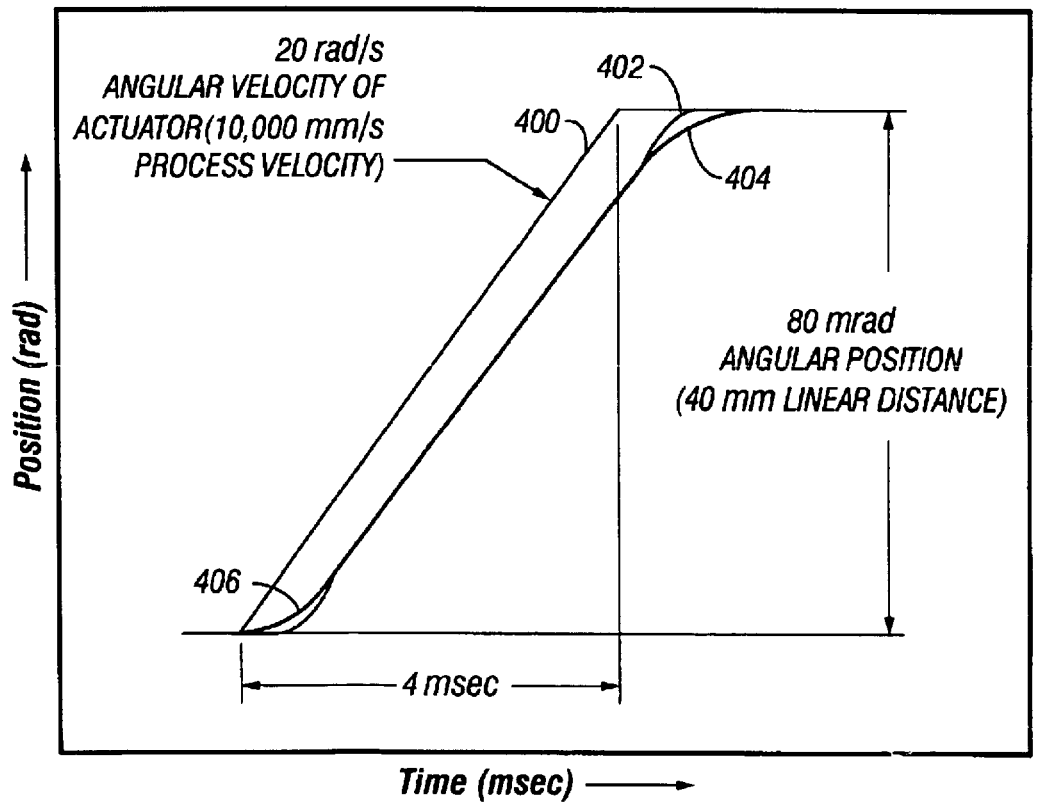
FIG. 4 shows a predicted position model for laser beam motion systems.

FIG. 4 shows a verification of a predictive model via a comparison of the model to what actually happens. The predicted position model and actual position feedback is monitored in order to obtain the FIG. 4 verification. The plot shows three separate traces. The trace 400 represents the position command, which is the commanded, position output to the motion system. The trace 402 represents the actual position feedback obtained with the position sensors. The trace 404 represents the predicted position feedback. The two traces overlap substantially. This verifies that the first order model with delay of the motion system actually forms an accurate predictive model. If the amounts of difference such as the positions of non-overlap 406 are not adequate, then a more complex model may be used.

Figure 5:
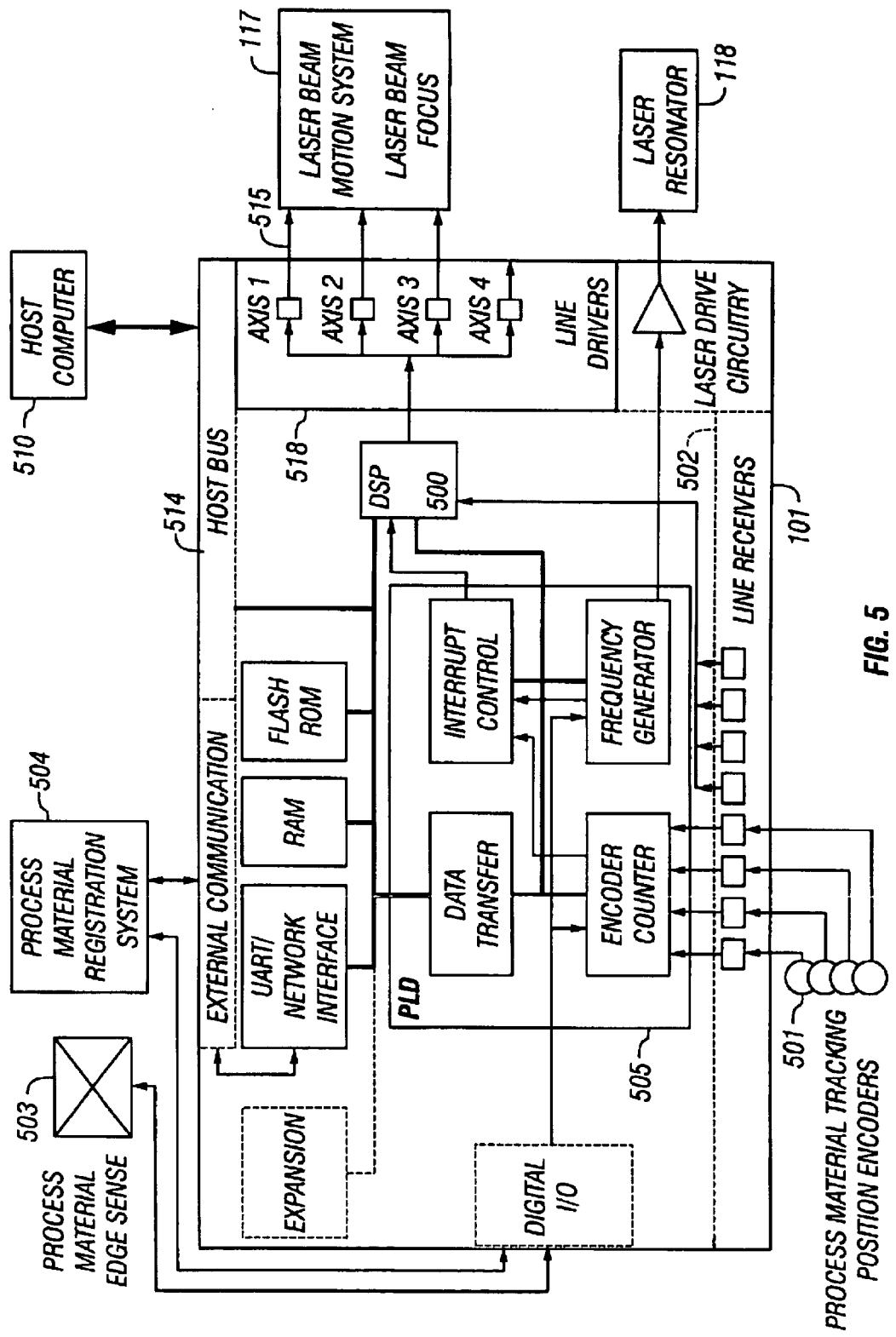
FIG. 5 shows a block diagram of a controller for controlling the various parts of the laser beam.

FIG. 5 shows a block diagram of controller 101. The controller receives inputs from a number of different subsystems. The process monitoring 200 may be received from the process material tracking position encoders 501. Each of these inputs may be input via respective line receivers 502. These encoders may themselves include certain errors, but may provide useful information, especially about the slower-changing variables. Another process monitoring element may be the edge sensor 503 which may detect the edge of the material. A registration system 504 may align the laser beam motion system with the process material. Certain operations may also be carried out in a host computer 510 which may communicate with the controller via a host bus 514. Outputs 515 control the actual controlled elements, which may include the laser resonator 118 and laser beam motion system 117.

The control may be carried out using two different control elements. A slower-calculating element, here a DSP element (Digital Signal Processor) 500 may carry out certain calculations including model calculations and other calculations which are numerically intensive. The DSP may control the elements which change more slowly, including the beam motion system 117. The DSP may perform the predictive model calculations, and also may optimize, compensate, and synchronize the laser beam motion and focus commands and laser power commands. The DSP may also update process variables. These operations may be done, for example, in less than a 100 microsecond update period. Each of these elements may be controlled through line drivers 518. In contrast, the faster reacting elements, such as the high-frequency controlled variables including power modulation of laser resonator 118, may be controlled by a faster calculating element here a PLD (Programmable Logic Device) 505. The PLD can operate in less than one microsecond. Therefore, the PLD may be used for the elements of the system which require faster operation, while the DSP may be used for slower elements.

Figure 6:
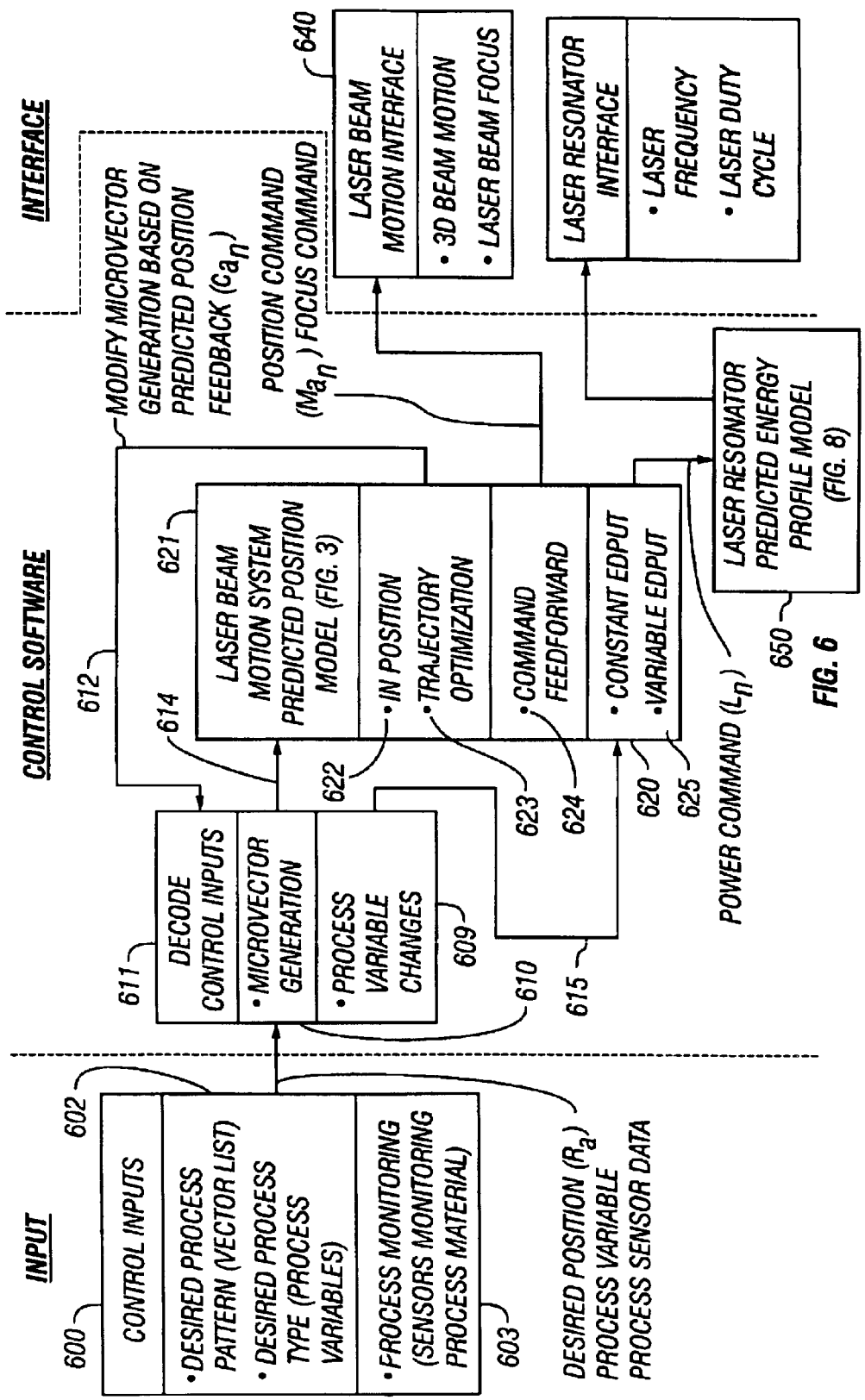
FIG. 6 shows a block diagram of the control software and interfaces.

FIG. 6 shows a flow diagram of the software that drives the controller 101. The control inputs are received at 600. These control inputs include the desired process information 602, and also the process monitoring information 603. The monitoring Information 603 is shown in FIG. 5 as the position encoder inputs 501, the process material edge sensing 503, and the process material registration system 504. This information may be used for process calibration, process material registration, and real-time actual tracking of the process material. The desired process information 602 includes information on the desired process pattern. This may be produced in the form of a vector list. The information may also include the desired process type, which may be the variables that form the desired materials process.

In this embodiment, the control software may use the DSP to generate process pattern microvectors 610 and process variable changes 609. Each microvector may be a position command of a small amount of motion of the motion system actuators. The length of the microvector may be related to the process velocity and the controller.

Process variable changes may also be calculated at 609. These process variable changes, for example, may include changes that are predicted by the results of the predictive models. These process variable changes may include changes in process velocity, pattern accuracy, and laser energy density, again, that are predicted by the model.

609 and 610 may receive inputs including the desired position data $R_a$, the desired process variables, and the process monitoring data. The microvector generation at 610 and the process variable changes at 609 may be adjusted based on feedback 612 from the predictive models as described herein.

The microvector outputs 614 and the process variable outputs 615 may be input to predicted models and associated control functions such as the predictive position model control 620. In this example, element 621 uses the predicted position model described in FIG. 3B to compute the predicted position feedback 612. Results of this and possibly other models may be used in control functions such as elements 622, 623, 624, and 625 to modify the microvector position commands and the associated process variables. Other predicted model controls and associated control functions may also be carried out.

The in-position control function 622 is described in further detail with reference to FIGS. 7A and 12. In example, the in-position control function may use the predicted position feedback to modify the microvectors by pausing the production of the microvectors, to allow the actual position to catch up with the commanded position. This function may facilitate the desired positions being reached before continuing execution of the process pattern. The values of tolerances may be selected depending on the desired accuracy of the end points for a desired position vector.

Figure 12A:
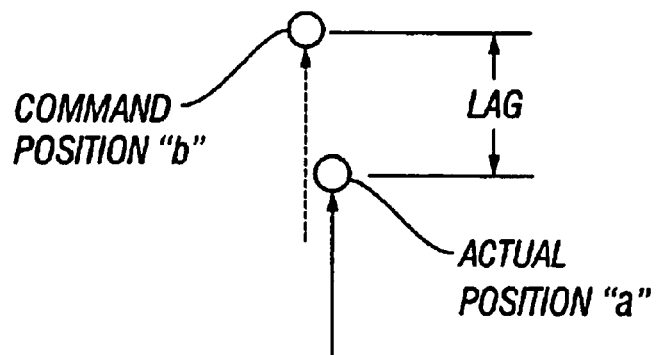
FIGS. 12A–12C show in position control function for sharp corner response.

The predicted position feedback model predicts that when the controller has commanded the system to be at point b, the actual lag in the system means that the actual position is really at point a. The difference between points a and b is, as shown in FIG. 12A, the "lag" In the system. This lag means that whenever the operation is commanding the system to be at point b, it is really only at point a.

Figure 12B:
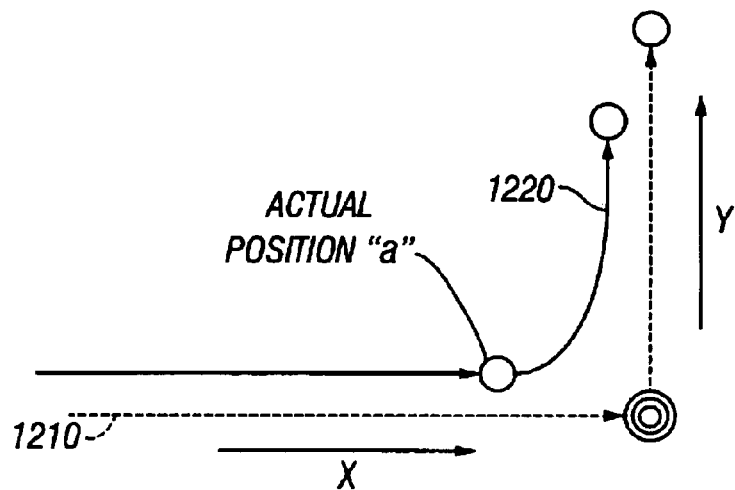

The effect of this lag on the formation of a corner is illustrated in FIG. 12B. It may be desired to form a sharp corner at the point R. The system is commanded to move in the "x" direction until reaching the point R. Upon reaching the point R, the system is then commanded to move in the "y" direction. The trace 1210 represents this desired sharp corner. However, the trace 1220 shows what is actually happening. When the control reaches the point R, the actual position is at the point a. At this point, control begins commanding the system to move in the "y" direction. The system responds by moving in the "y" direction, thus rounding the corner beginning at the point a. The actual corner is therefore rounded because of the lag in the system.

Figure 12C:
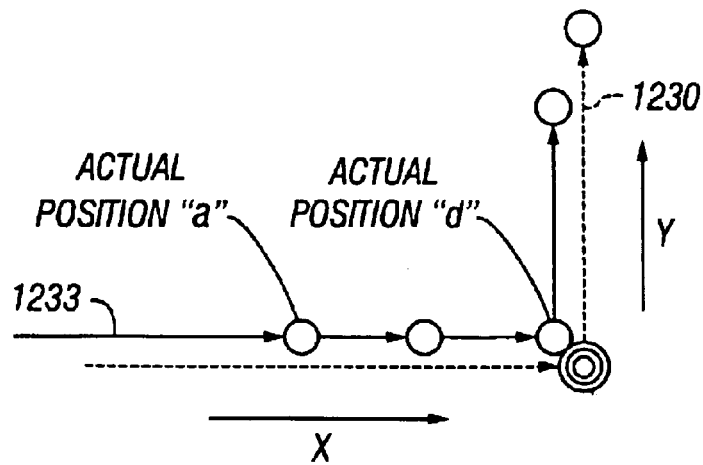

The in-position control function uses the model to predict this inherent lag in the system, and therefore operates as shown in FIG. 12C. The desired corner is shown as trace 1230. Taking into account the lag in the system, commands are executed which form microvectors that allow the system to keep moving in the "x" direction 1233 until the model indicates that the system has actually reached the point d. Accordingly, at this point, microvectors are created to begin movement in the "y" direction. The effect is that the system more closely follows the desired path.

Figure 7A:
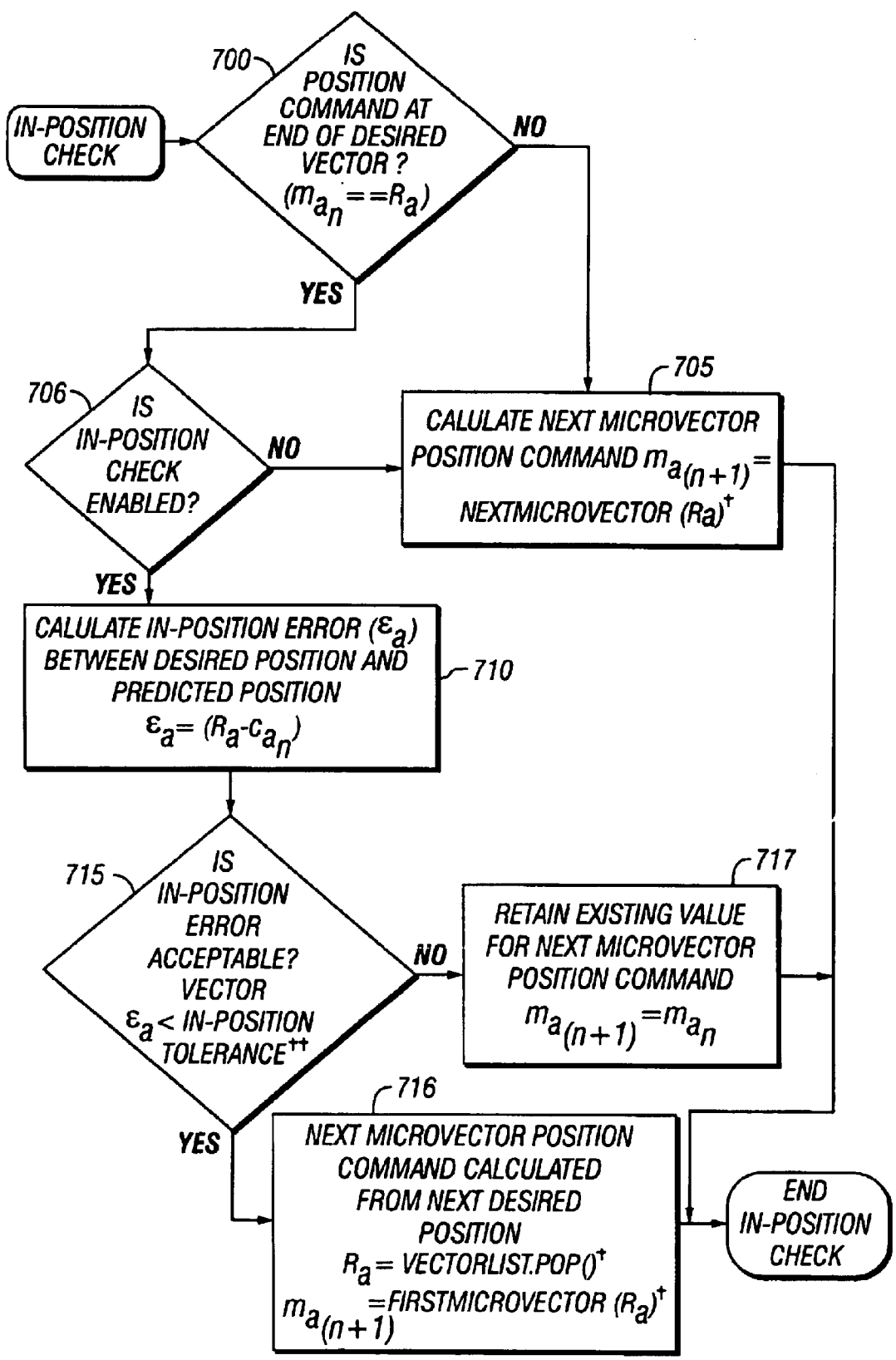
FIG. 7A shows an in position control function based on the predictive model.

FIG. 7A shows the flowchart operation for the laser beam in-position control function. At 700, the controller checks to see if the microvector position command is at the end of the desired vector. If not, the next microvector position command is calculated at 705. However, if the position command is at the end of its desired vector, then 706 checks to see if the in-position control function is enabled. For example, some processes may not need the in-position control function, and therefore may skip the control function entirely.

If the in-position control function is detected as being enabled at 706, then 710 calculates the in-position error between the desired position and the predicted position. This in-position error is shown as the variable "$E_a$". The in-position error is compared with the in-position tolerance at 715. If the error is acceptable, that is, the error is not beyond a defined amount, the next microvector position command is calculated from the next desired position at 716. If not, that is if the in-position error is not acceptable at 715, then the existing value is retained at 717 for the next microvector position command. Effectively, 717 allows the predicted position to catch up to the desired position.

The trajectory optimization control function, shown as 623 in FIG. 6, may change the motion system velocity to further optimize the microvector position commands. Trajectory optimization may ensure that the predicted position feedback stays within a selected dynamic tolerance. This may be done by superimposing the predicted position trajectory over the position command trajectory using a curve fitting technique. While any curve fitting technique may be used, the least squares method may produce certain advantages. In operation, if at certain points along a trajectory, the predicted position error exceeds the selected trajectory tolerance, then position commands may be modified to decrease the velocity of the motion system around those points. This effectively increases the accuracy by decreasing the velocity around those points that exceed the trajectory tolerance.

Figures 1, 7B:
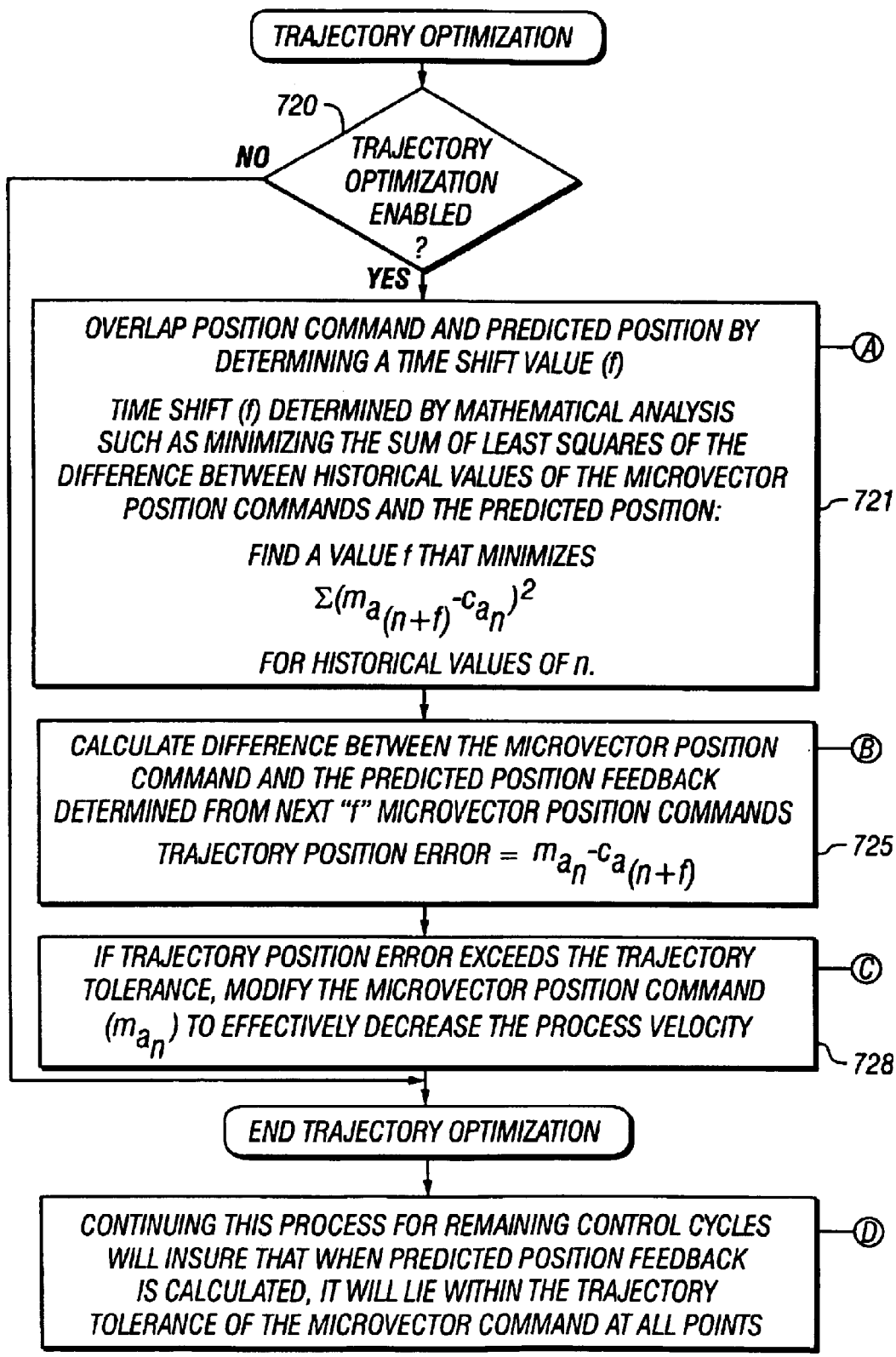
FIG. 7B shows a trajectory optimization based on curve fitting and determination of out of trajectory tolerance.
Figures 2, 7B:
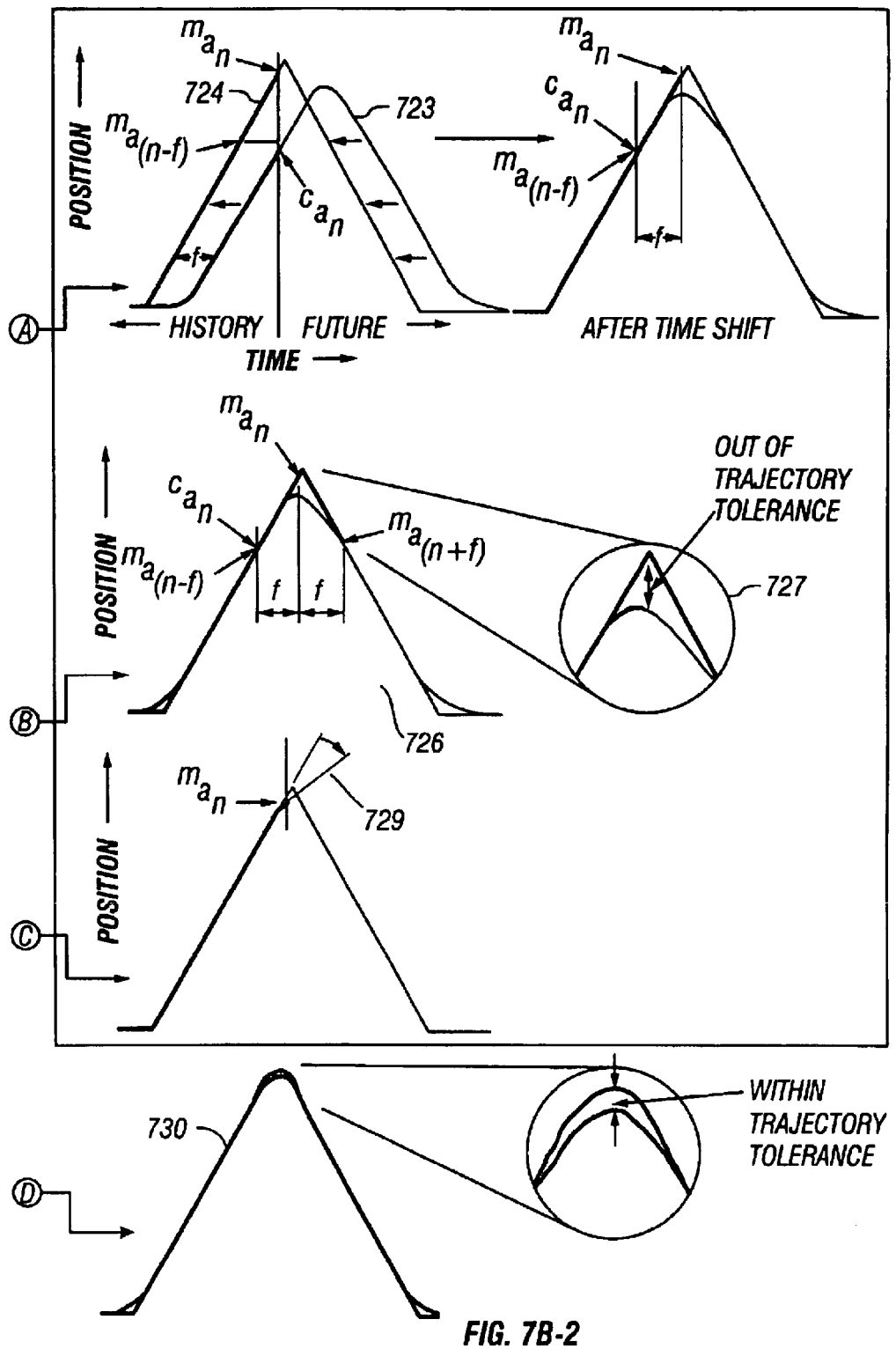

A flow chart of the trajectory optimization control function is shown in FIG. 7B. This operation may use the predicted position model to effectively look into the future, and time shift the predicted response. The trajectory position error may then be determined. The microvectors may then be modified to keep the amount of the trajectory error acceptable.

At 720, the controller detects whether trajectory optimization is enabled. If so, then 721 determines a time shift value "f". The time shift value represents the difference between the predicted position response shown as 723 and the commanded position shown as 724. The time shift value "f" may be determined by mathematically analyzing 723 with 724 in order to find a best curve fit or minimizing the differences between 723 and 724.

At 725, the controller calculates the differences between the microvector position command and the predicted position feedback for a microvector position command which will be produced at a future time "f". This trajectory position error and tolerance are shown in the curves 726 and in more detail in 727.

728 calculates if the trajectory position error exceeds the trajectory tolerance. In the example shown, the microvector positions are out of tolerance and the microvector position commands may be modified as shown at 729 to effectively decrease the process velocity. The effect is that the system catches up with the lag as shown in 730. This effectively ensures that when the predicted position feedback is calculated, it will be within the trajectory tolerance of the position command at all points.

The command feedforward control function shown as 624 in FIG. 6 uses well-known feedforward control methods to improve system performance. The microvector position commands may be mathematically compensated using the inverse of models such as the predicted position model to anticipate system dynamics.

Figure 7C:
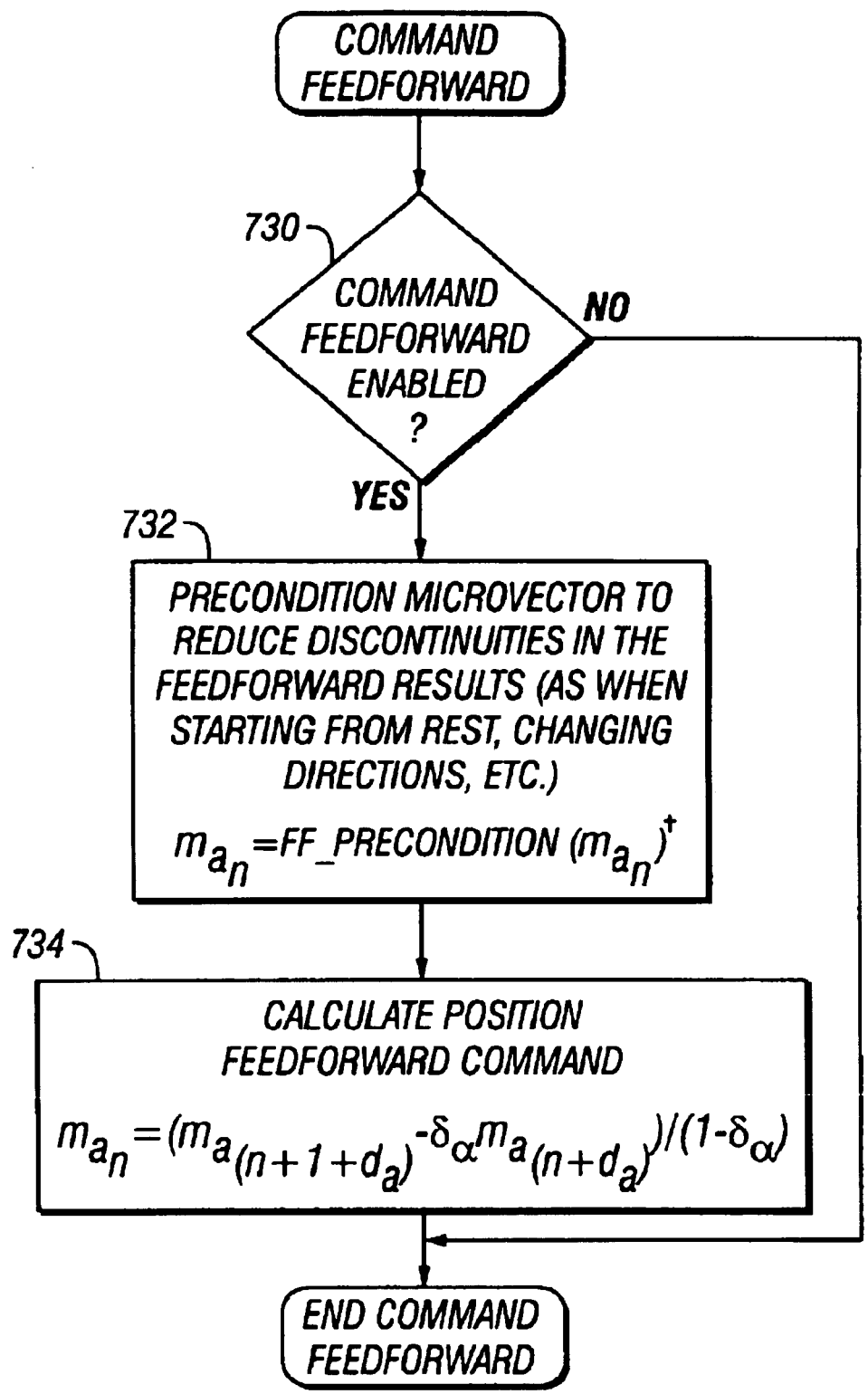
FIG. 7C shows a model based system based on command feed forward system.

A detailed flowchart is shown in FIG. 7C. The process begins at 730 with determining if the feedforward control function is enabled. If so, 732 identifies discontinuities in the feedforward results to reduce system instability that may occur at these locations. For example, when the system is starting from rest or changing directions or the like, it is well-known that there may be system instability if feedforward control is used. The feedforward command may be calculated at 734 by taking the mathematical inverse of system models such as the predicted position model shown in FIG. 3B.

Figure 7D:
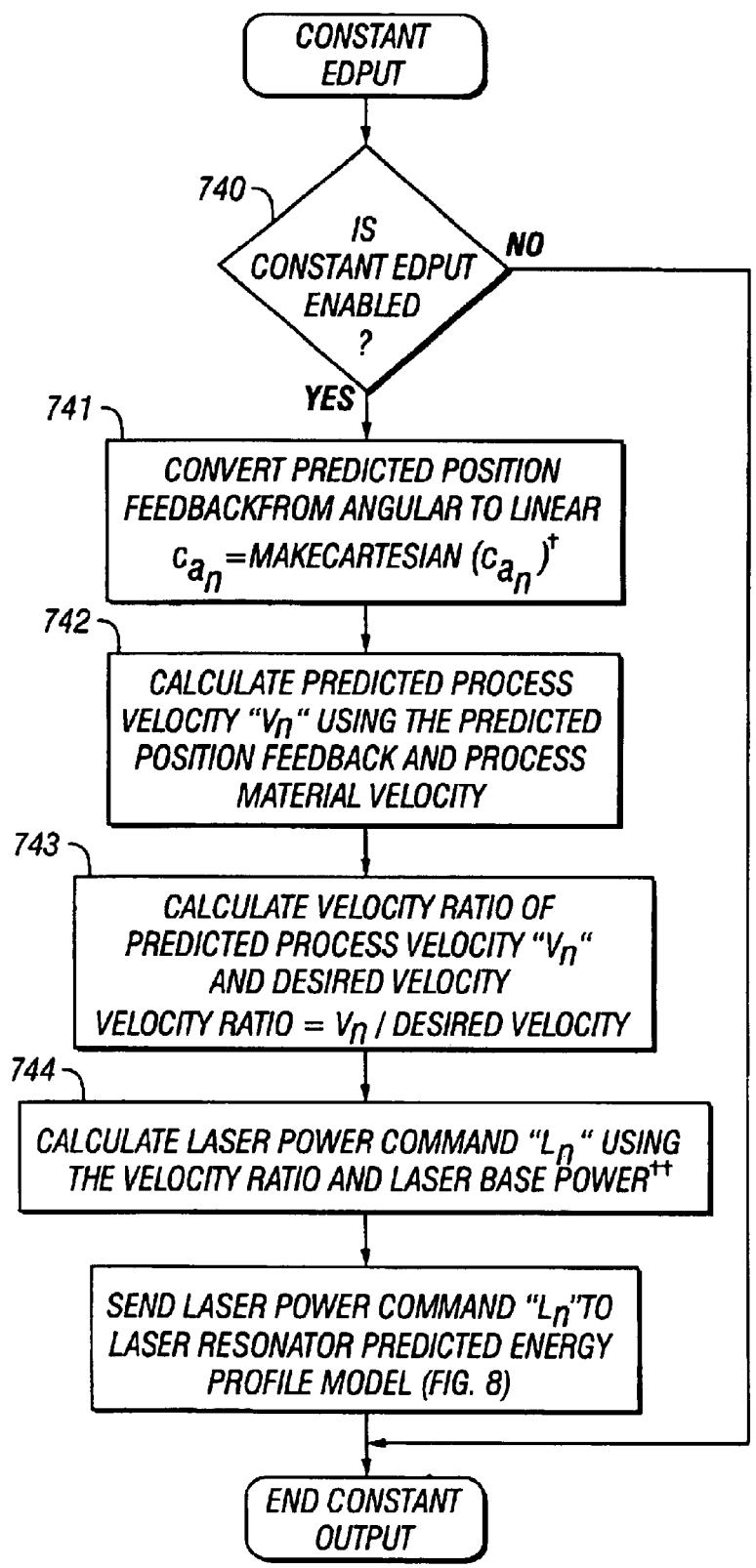
FIG. 7D shows a constant energy density control function.
Figure 7E:
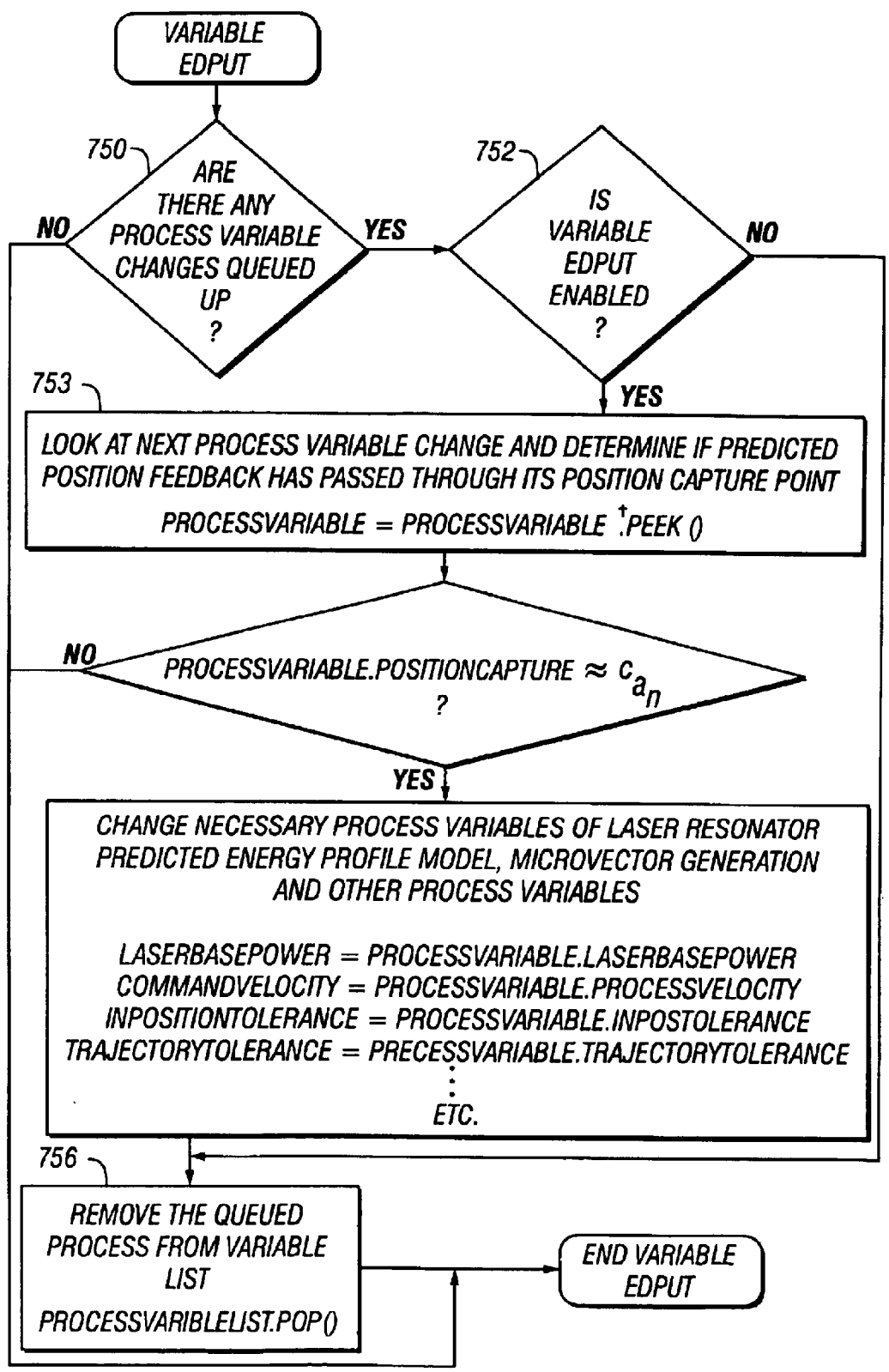
FIGS. 7E and 7H each show control functions for variable energy density.

Element 625 represents the portion of the predictive position model control 620 that calculates a laser power command $L_n$. The amount of laser energy that is delivered to the process material per unit area is defined here as laser energy density or EDPUT. The EDPUT control element 625 may control either constant delivery of laser energy density (constant EDPUT) or variable delivery of energy density (variable EDPUT). The two embodiments are shown in FIGS. 7D and 7E FIG. 7D shows the constant EDPUT control function. This may be based on the calculation of predicted process velocity and a corresponding amount of laser power that may be commanded. Effectively, in this implementation of the constant EDPUT, the laser power command can be varied in order to deliver a uniform amount of energy to the process material, independent of system dynamics such as lags and velocity changes. For example, system inertia and other dynamics may cause a slowdown of the laser beam motion system in order to form sharp corners on the process material. Constant EDPUT may reduce the laser power command to maintain the delivery of constant laser energy density to the process material.

740 determines if constant EDPUT is enabled. If so, 741 may convert the predicted position feedback from angular coordinates to linear coordinates. These values may be used to predict the process velocity at 742. 743 computes the velocity ratio between the predicted process velocity and the desired process velocity. A laser power command may be calculated at 744 using the velocity ratio and a laser base power. The laser power command may then be sent to the predicted energy profile model for the laser resonator. The predicted energy profile model is described in further detail with reference to FIG. 8A.

Figure 7F:
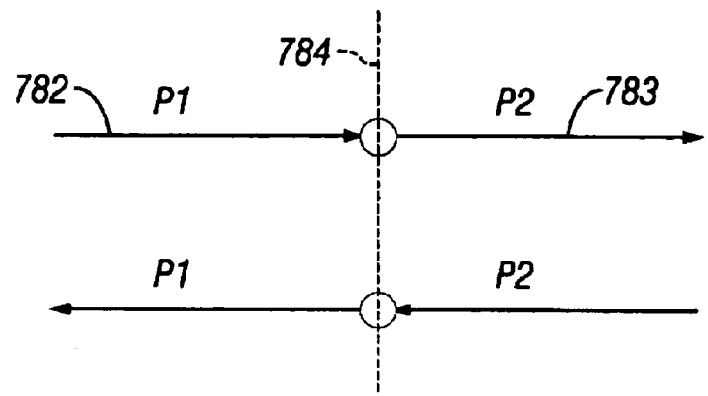
FIGS. 7F and 7G show the energy density control function energy pass response.
Figure 7G:
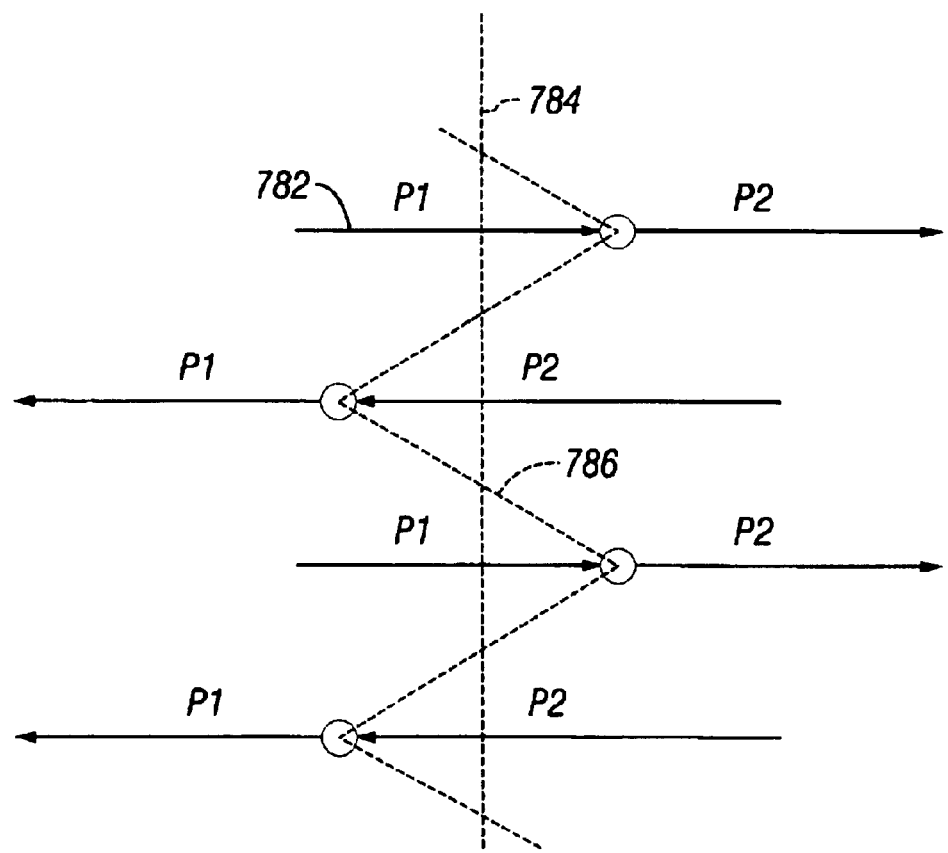
Figure 7H:
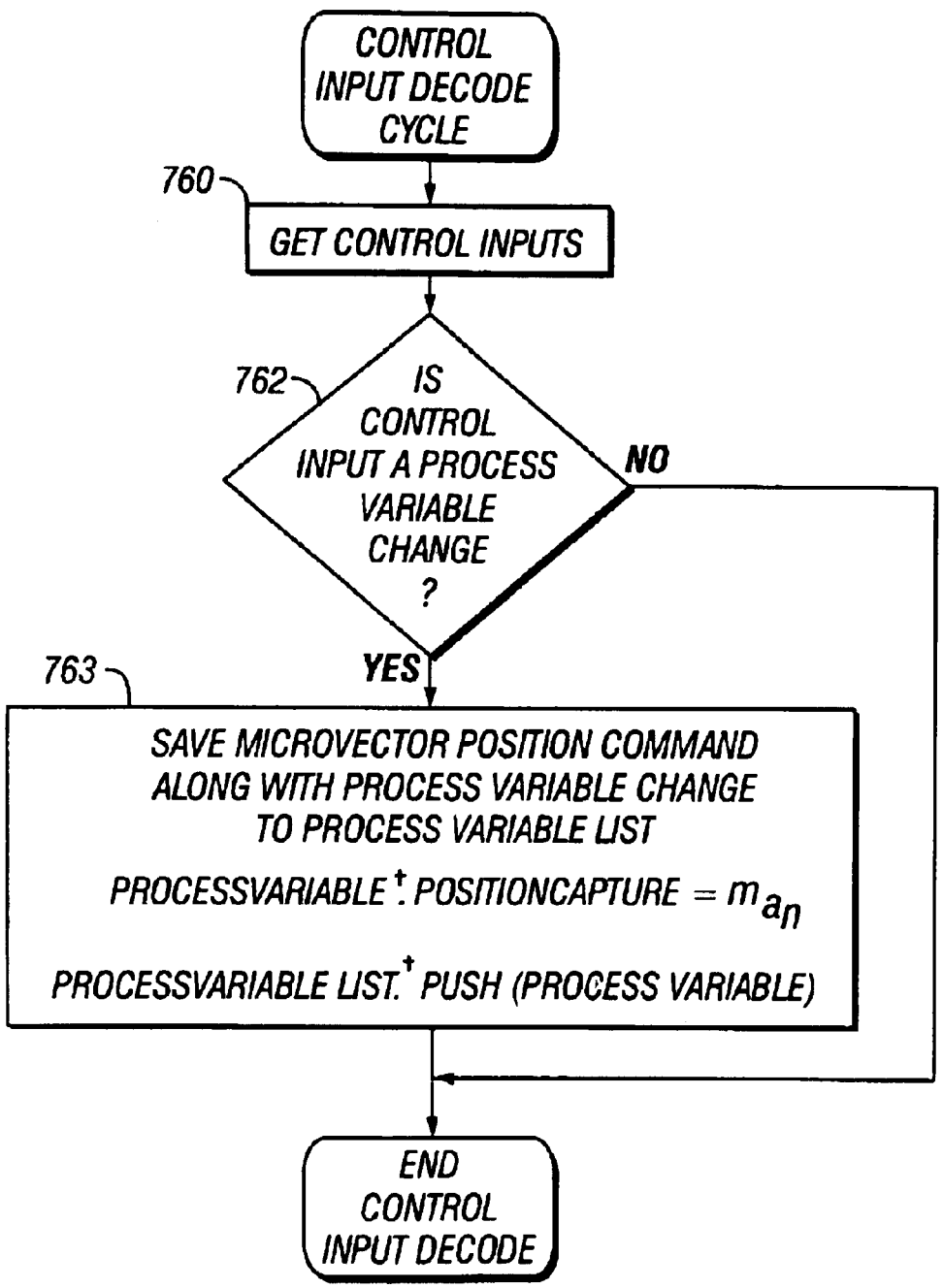

The variable EDPUT control function, shown in FIG. 7E, may be used to synchronize changes in laser power commands to specific locations on the process pattern, independent of process velocity and system dynamics. For example, FIG. 7F shows how it may be desirable to form a pattern having a first area 782 formed at a first laser energy density P1 and a second area 783 at a second energy density P2. The change from P1 to P2 occurs at a constant location 784. The predicted position model predicts that lags in the system may actually create a zigzag pattern 786 shown in FIG. 7G. The same predicted position model, however, may be used to maintain a constant location 784. FIGS. 7E and 7H show how this may be corrected.

The initial operation of variable EDPUT requires execution of the flowchart shown in FIG. 7H. FIG. 7H receives the control inputs at 760, and first determines at 762 if the control input is a process variable change. If so, then the microvector position command may be queued at 763 along with the process variable changes. 750 shown in FIG. 7E accesses this process variable list. If process variable changes are queued at 750, then 752 detects whether the variable EDPUT control function is enabled. If so, 753 may be executed to examine the next queued variable change and determine if the predicted position feedback has passed through the position capture point of the queued process variable e.g. the constant location 784. If not, no action is taken, but if so, then the queued process variable may be changed in 755. At 756, the process variable is removed from the queued list., Continuing with FIG. 6, the predicted position feedback 612 produced from the models and associated control functions may be used to feedback to 611 in order to facilitate microvector generation and process variable change calculations. For example, microvector generation may be altered due to results of in-position 622 and trajectory optimization 623, and process variables may be removed from the queue according to the predicted position feedback.

Figure 8A:
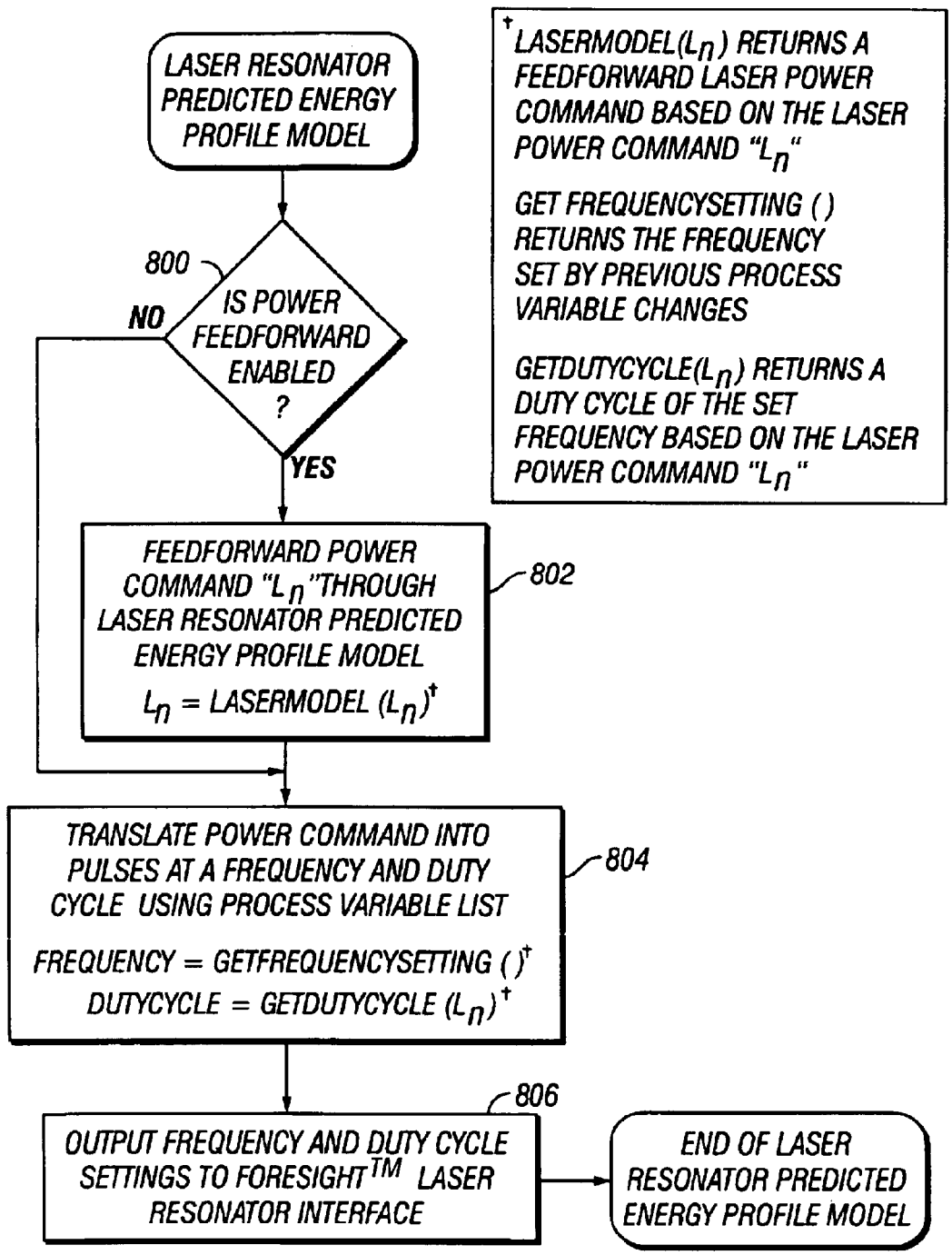
FIGS. 8A and 8B show operation of laser power control using an energy density model.
Figure 8B:
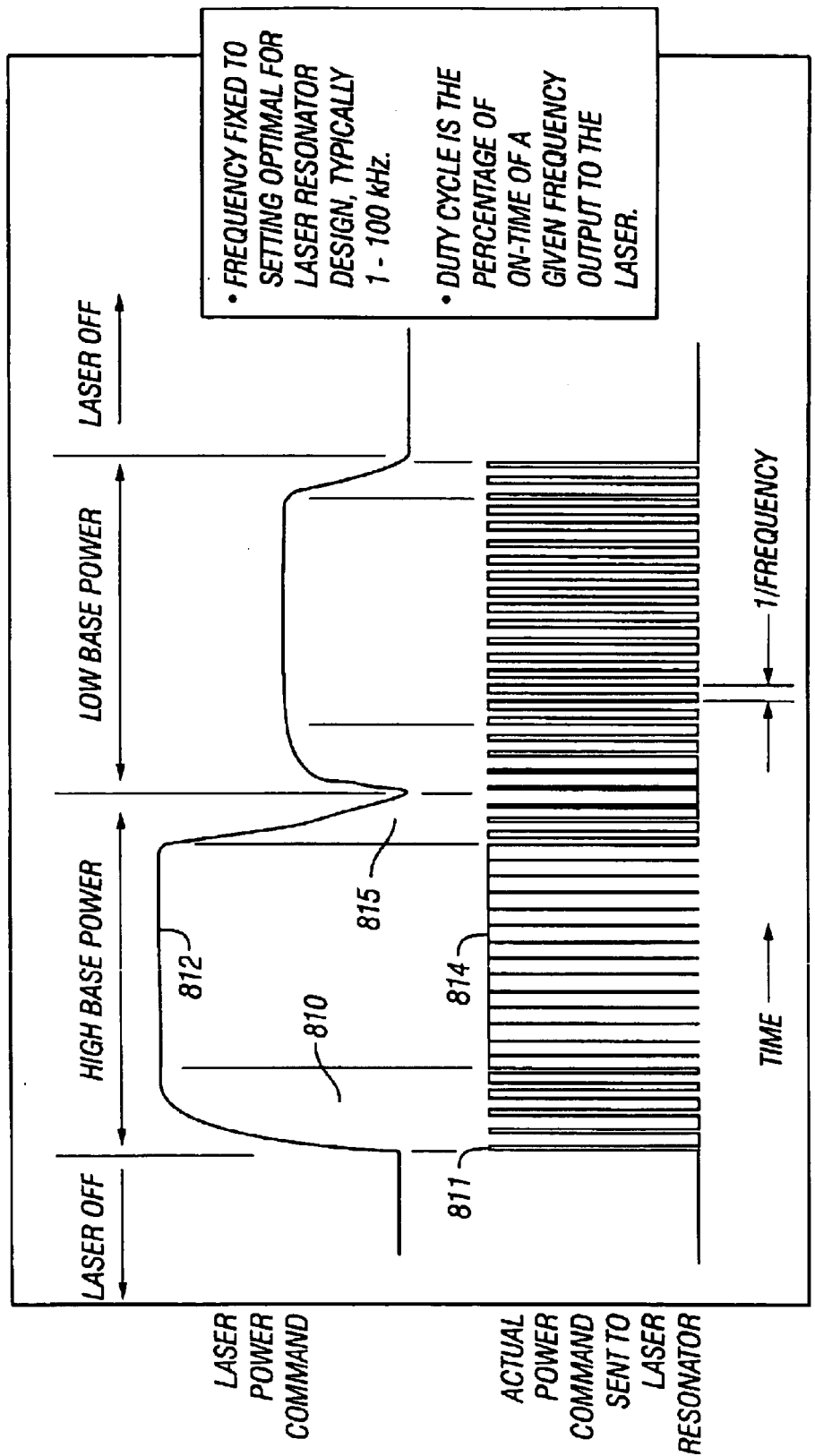

The outputs from the predictive position model control 620 may also be used to drive the laser beam motion system as 640, and may also be applied to the laser resonator predicted energy profile model 650. FIGS. 8A and 8B show an example of control functions using a predicted energy profile model. This control function feeds forward the laser power command through the predicted energy profile model of the optical delays, non-linearities, and other transients that may be observed in the actual energy profile of the laser resonator. The adjusted laser power command may then be used to create a modulated control frequency that is output to the laser resonator.

At 800, the controller detects whether power feedforward is enabled. If so, then 802 may feedforward the power command through the laser resonator predicted energy profile model. 804 translates this power command into pulses at a varied ratio between time on and time off, e.g. changing of frequency and duty cycle using a process variable list. The frequency and duty cycle list are output at 806.

FIG. 8B shows the laser power command. During the time that the power command is ramping up to the high base power shown as 810, the duty cycle of the laser modulation 811 which is sent to the laser resonator may increase. After the laser power command has ramped up to the steady-state location shown as 812, the steady-state pulses 814 may be produced. While the laser is ramping down, a lower duty cycle pulses shown as 815 may be produced. Analogous calculations may occur during the times of lower base power.

The present system may allow automatic and synchronized compensation of laser beam motion and energy density at increased performance rates. This system may be used to accurately predict and synchronize motion system position, process velocity, and laser energy density at any location on the process pattern.

Figure 9G:
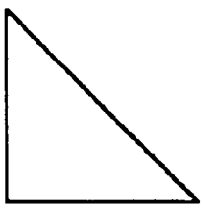
Figure 9F:
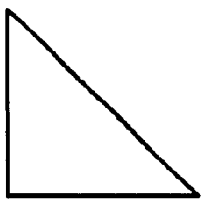

Many different applications of the present system may be possible. For example, controlled-depth cutting may use the in-position control function and the constant EDPUT control function in order to produce an accurate pattern at high process velocities. FIG. 9A illustrates this function. FIG. 9A shows the desired process pattern and specifically for example, the computer-aided-design artwork which forms this process pattern.

Figure 9B:
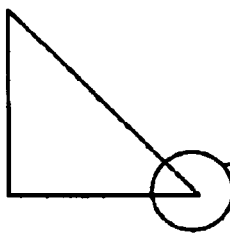
Figure 9A:
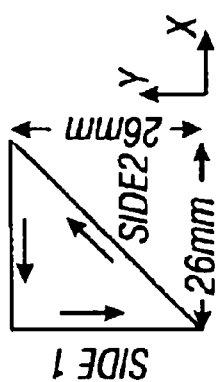
Figure 9D:
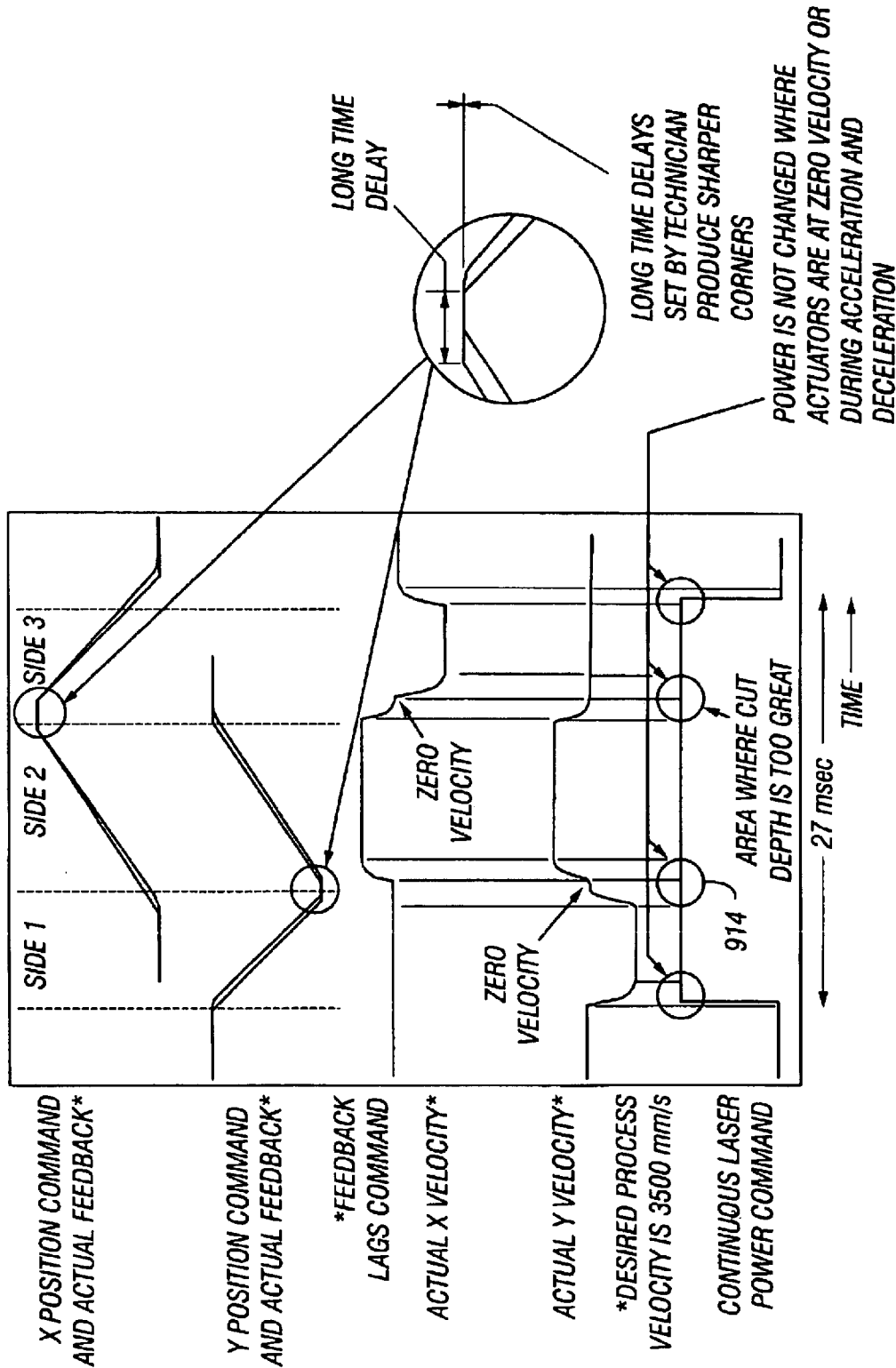

The actual process pattern that may be produced by prior art is shown in FIG. 9B. Because too much energy is applied during the acceleration and deceleration, areas of increased processing may be formed at areas such as 900. FIG. 9C shows how this was handled by the prior art. Trace 905 shows the "x" position command with actual feedback, with 906 showing a magnified view of this location. In the prior art, short time delays may be manually set by the technician based on his experience in order to balance increased cut depth with sharp corners. Analogously, 907 shows the "y" position commands. Traces 910 and 911 show the actual "x" and eye velocity, and trace 912 shows the laser power command that is produced during this time. Note that power is not changed during acceleration and deceleration in this prior art FIG. 9D shows the increased time delays which may be used by prior art. Longer time delays are set by technicians to produce sharper corners. However, because the power is not changed where the process velocity is near zero velocity 914, this may cause positions of increased cut depth as shown in FIG. 9G.

Figure 9E:
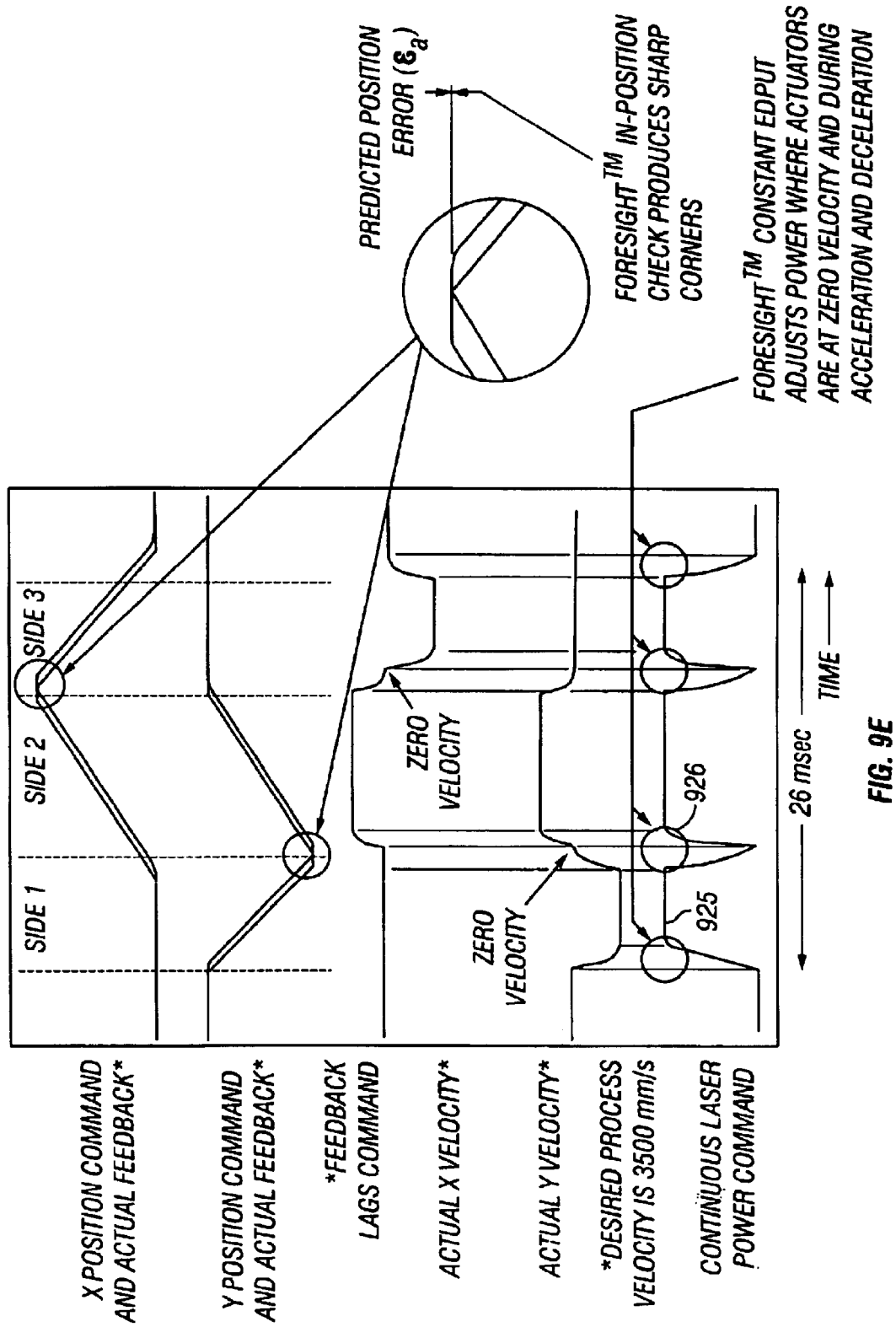

FIG. 9E shows how the present system may implement controlled-depth cutting using the in-position control function to produce sharp corners. In the present system, the laser power command shown as 925 may also be adjusted by the constant EDPUT control function at positions where the process is at zero or low velocity. For example, in the position 926, where the process velocity is accelerating or decelerating, the laser power may be controlled to maintain controlled-depth cutting. The actual process pattern produced by the present system is shown in FIG. 9F.

Another application of the present system is position-based perforating. Position based perforating refers to a laser materials process where laser energy density may be varied to produce a series of through holes, blind holes, slots, score perforations, etc. in specific locations and at precise intervals. Only a single line 1000 shown in FIG. 10A may be used to evaluate a controller's performance. This line was placed along the "x" direction and split into equal lengths representing a series of perforations. The desired process velocity maybe set to 7,000 mm/second.

Figure 10A:
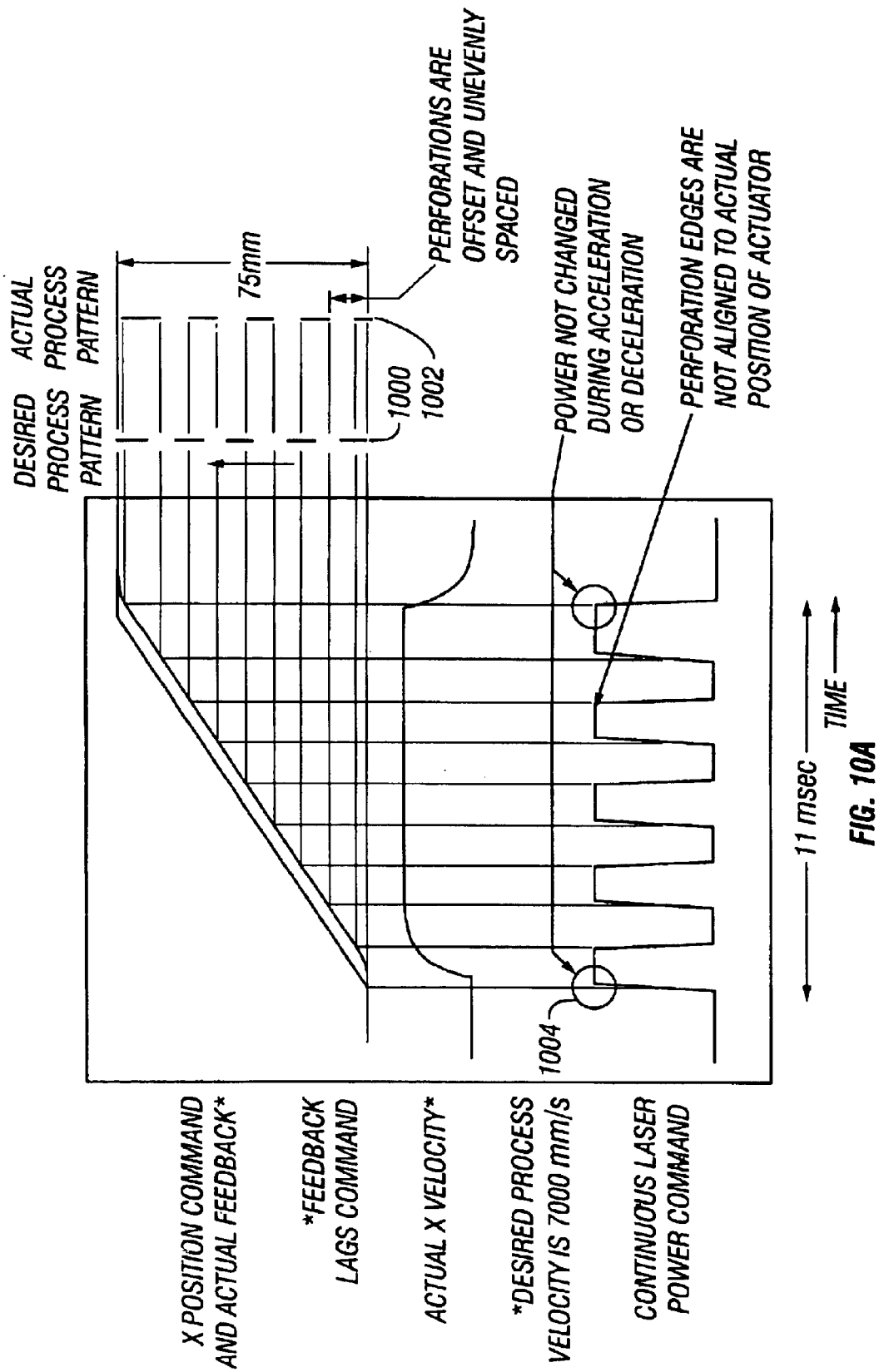
FIGS. 10A and 10B show position based perforation.

FIG. 10A shows how this may be controlled by prior art. The desired process pattern shown as 1000 is not actually formed, but rather the actual process pattern 1002 may be produced. The perforations may be offset from the desired perforation locations, and unevenly spaced. This is because the actual position lags the position command. Moreover, the cut depth is not controlled during acceleration or deceleration 1004.

Figure 10B:
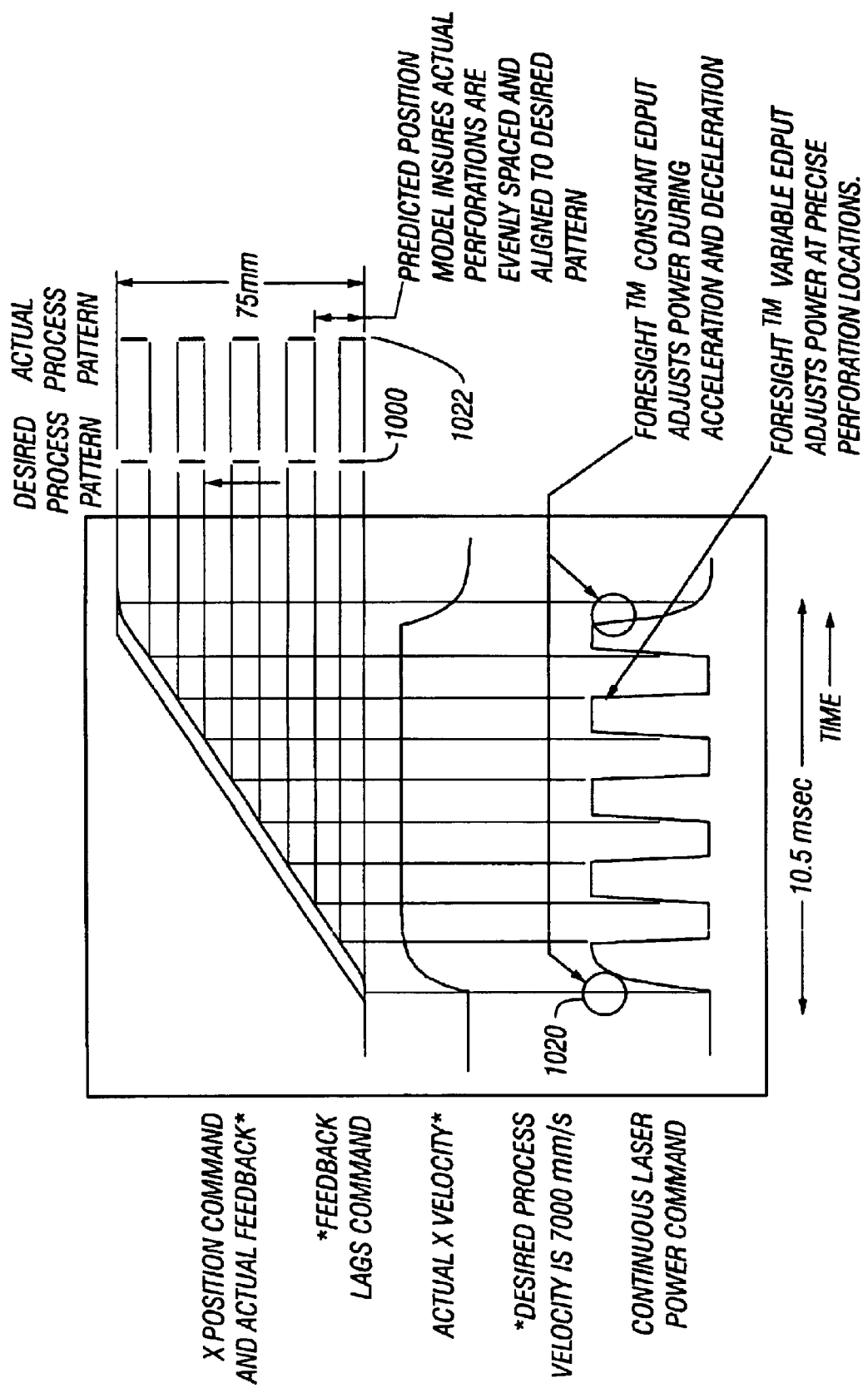

FIG. 10B shows the present system which uses the predicted position model to ensure that the actual perforations are evenly spaced and aligned to the desired pattern. This may be done, for example, by using the predicted position feedback and variable EDPUT control function to determine the actual position to change the laser power command. In addition, as shown by 1020, the laser power command may be modified by constant EDPUT control function so that cut depth may also be controlled during acceleration and deceleration. The actual process pattern produced by the present system is shown in 1022.

Figure 11A:
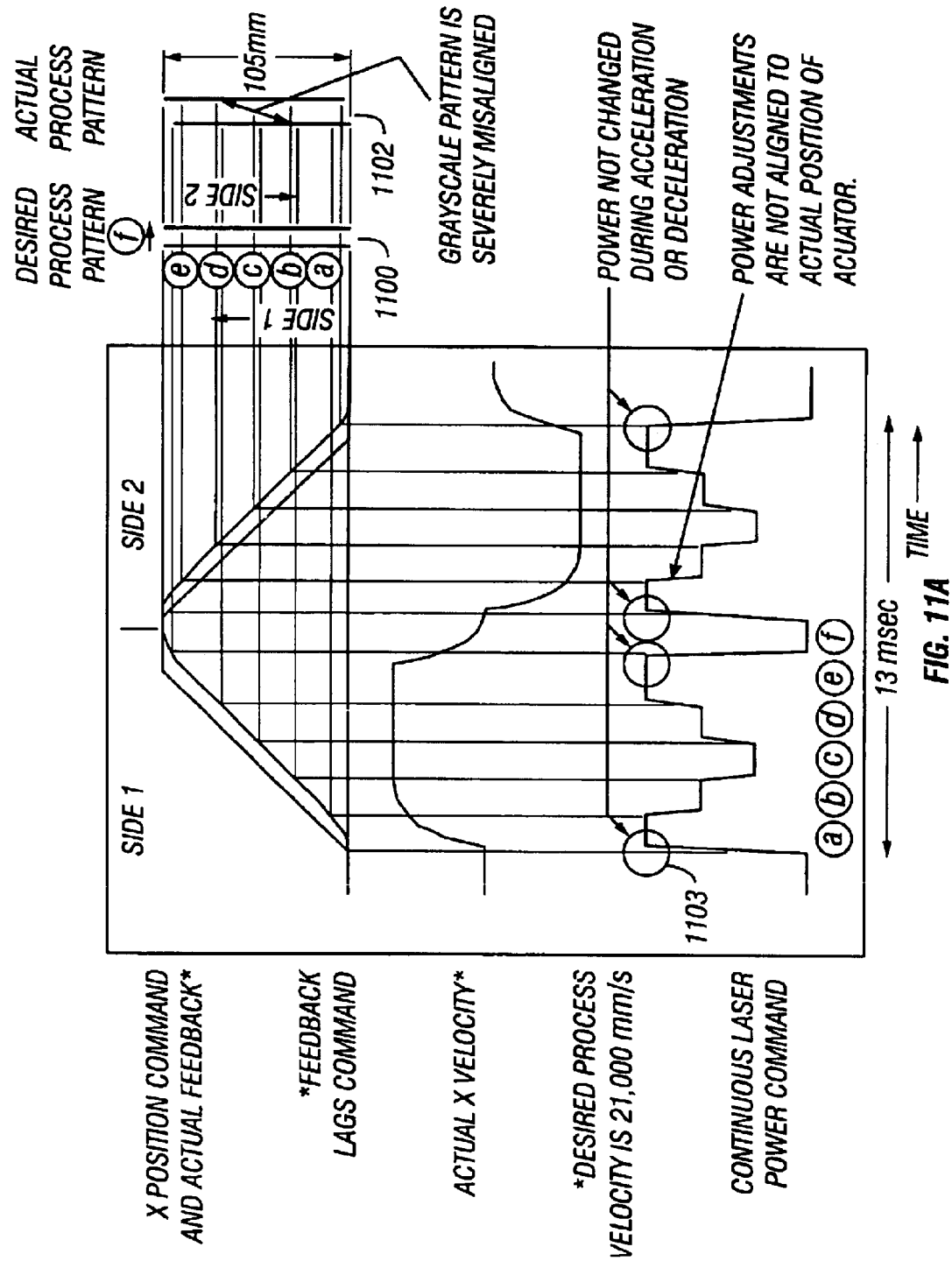
FIGS. 11A and 11B show operations for grayscale scribing.

Another application is in grayscale scribing. Grayscale scribing refers to a laser material process where laser energy density is controlled to produce a grayscale image. One efficient method to produce a grayscale image is to rapidly reciprocate the laser beam back and forth across the image area. Therefore, only two lines 1100 of a reciprocating pattern are needed to evaluate a controller's performance as shown in FIG. 11A. Both lines are aligned to the "x" direction and each line has 5 identical laser power changes (identified by a, b, c, d, e) occurring at equidistant locations along the line. The lines are spaced a short distance apart along the bye direction, (identified by "f" in 1100). The desired process velocity was set to 21,000 mm/second.

FIG. 11A shows how existing controllers may produce an actual process pattern 1102 which is misaligned relative to the desired process pattern 1100. This may be caused by the actual position lagging the position command. Laser power is not changed during acceleration or deceleration 1103 and the power changes are not aligned to the desired locations.

Figure 11B:
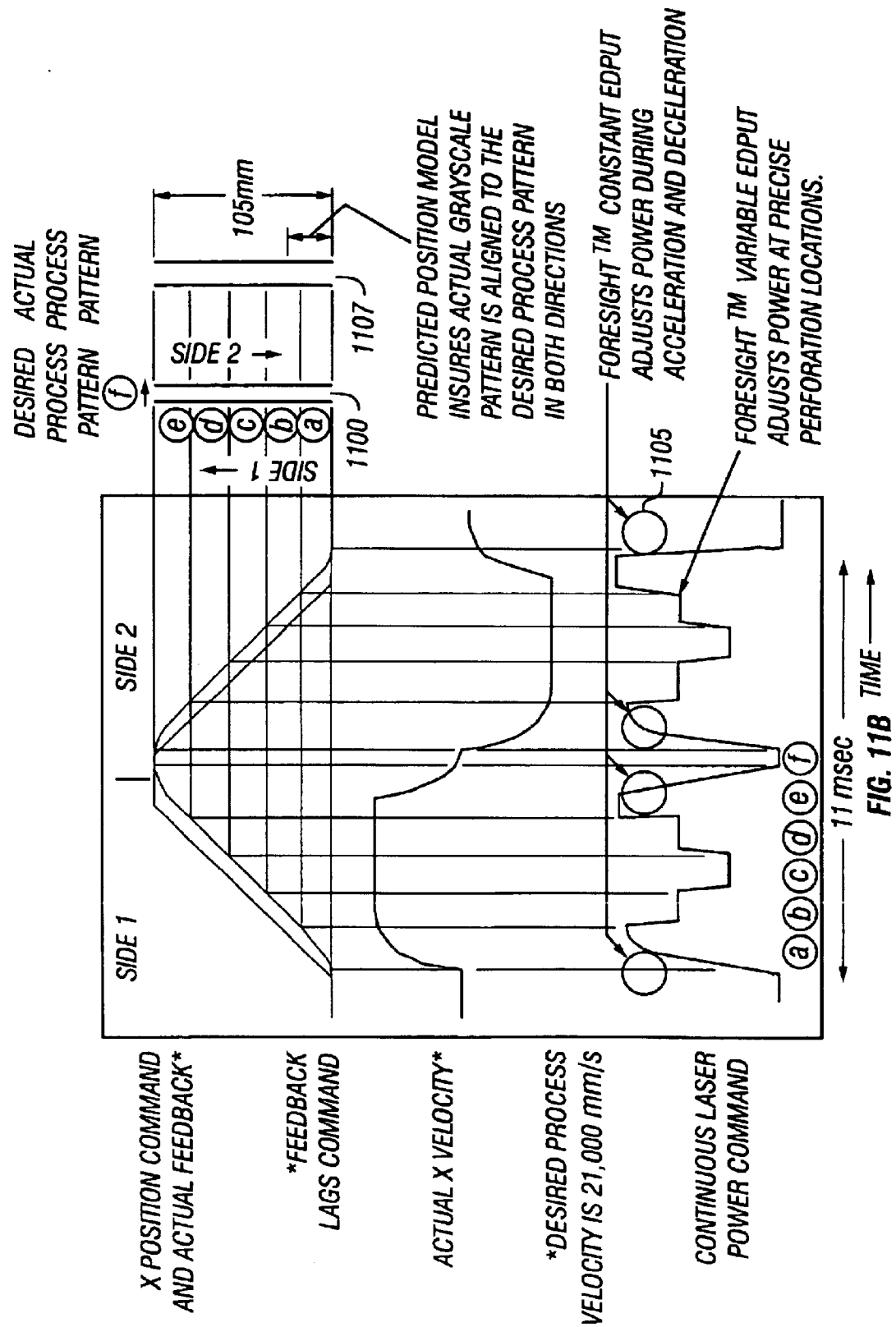

FIG. 11B shows the present system in which the actual process pattern is aligned to the desired process pattern in both directions. Using the predicted position feedback and variable EDPUT control function, laser power may be changed at the correct locations. Laser power may also be adjusted during periods of acceleration and deceleration, as shown by 1105, using the constant EDPUT control function. The actual process pattern produced by the present system is shown in 1107.

According to the present system, all laser materials processes may use motion system trajectory optimization, motion system command feedforward, and the laser resonator predicted energy profile model in order to improve process performance. However, other models and associated control functions such as laser beam focus, laser beam optics, process material, and material handling equipment may also be included.

One example is a laser beam focus model to predict focused beam cross-sectional area as a function of the predicted angular position of a galvanometer motor actuator. As previously discussed, galvanometers may change the laser beam position by angular deflection. As a result, the laser beam cross-sectional area on the process material may vary with the deflection angle, which may produce inconsistent and inaccurate process results. A mathematical model based on the predicted position model can be constructed to predict focused beam cross-sectional area. The results of this model may then be used to modify the laser power, focus, and position commands.

Another example is a process material model to predict material reaction to the laser energy density. This model is useful for select process materials where at the start of the process pattern higher laser energy density levels are required to initiate the desired laser materials process and lower energy density levels are required to sustain the process. Well-known stochastic modeling techniques can be used to model complex behaviors such as material interaction with a laser beam energy density. The results of this model can then be used to modify the laser power, focus, and position commands.

Another model may predict the laser beam focus actuator by modeling the response of the actuator that is moving a focusing lens and therefore, focus location. The actual focus location may lag the actuator position command.

Other models may model material, for example the chemistry of the process material. The modeling may predict the materials reaction that the laser. For example if the material is a certain kind of plastic, the laser energy density may be automatically controlled to cut that specific material. The material handling system may also be modeled including the inertia of that system, and/or elasticity of the process material when used with the specific material handling system.

Another embodiment of the invention includes the simulation of the laser materials process prior to actual manufacturing. Using similar mathematical models and methods developed by the inventors, the manufacturer can use the predicted process results to:

- øPredict process quality and production time;
- øOptimize process variables to maximize process quality and minimize production time;
- øDevelop an accurate justification for process investments; and
- øDevelop an accurate manufacturing cost for proposals to customers.

This application of the invention operates as a stand-alone software application on a standard desktop computer.

Laser beam motion systems of the type described herein may be designed to achieve high process velocities typically use linear motors, polygon or resonant scanners, voice coils, or galvanometer scanners, all of which are known in the art. An optical mirror or lens may be directly attached to the actuator. The actuator with an optical mirror may deflect or steer the laser beam. An actuator with an optical lens may be used to change a focus location of the laser beam. The properties of actuator selection are determined by inertia of the optical component mounted to the actuator, desired acceleration and velocity, and desired motion travel and precision.

Many actuators may be used in a laser beam motion system designed for high-performance laser materials processing: position actuators 1 and 2 have optical mirrors and are used to steer/deflect the laser beam in 2 dimensions. Focus actuator 3 has an optical lens and maintains laser beam focus for flat 2-dimensional processing or adjusts focus location for 3-dimensional processing.

Linear motors may use a series of permanent magnets mounted on a linear track upon which a moving coil travels. Linear motors can carry among the highest inertia loads and travel the farthest. However, these may be limited to 2,000 to 8,000 mm/second peak velocities and have relatively low accelerations of 2 to 3 G's. Polygon scanners may use a multi-faceted mirror attached to a motor shaft that is rotating around 10,000 revolutions/minute. Resonant scanners use a flat mirror attached to a motor shaft that is resonating at a fixed frequency of 1 kHz typical. Both polygon and resonant scanners are able to scan at extremely high process velocities (>100,000 mm/second) but their unidirectional fixed design prevents their general application in laser material processing where 2-dimensional or 3-dimensional patterns are made. Voice coils typically utilize a tubular permanent magnet with a moving coil traveling inside. Voice coils have good accelerations of 20 G's but may be limited to 10 mm travel and 2,000 mm/second peak velocity.

Galvanometer scanners are one of the most common actuators used in motion systems for high-performance laser materials processing. A galvanometer scanner designed for angular deflection of the laser beam typically uses a flat mirror attached to a limited-rotation motor (typically limited to +20° optical scan angle). An analog position detector integrated into the actuator feeds rotational position back to the actuator's analog servo-driver board that adjusts motor current to control actual position relative to the position command received from the laser machine tool's controller.

Existing controllers convert angular motion to linear or Cartesian motion using look-up tables or geometric equations for flat process material such as paper sheets. Galvanometer scanners offer high process velocities (>2,000 mm/second), precision positioning, and excellent accelerations well over 200 G's. Process velocities ranging from 1000 to 20,000 mm/second are typical of galvanometer scanners used in laser materials processing.

Laser beam motion systems used in high-performance laser materials processing may have inertia limitations. Changes in process velocity or direction cause dynamic position and velocity errors relative to the desired process pattern. Existing controllers may produce process patterns that are distorted in shape and show inconsistent laser energy density delivered to the process material because of these dynamic errors. Existing controllers also are designed primarily for point-to-point motion profiles where precise changes in laser energy density are not possible at specific positions between points.

Existing controllers control the motion system in step, raster, or vector motion profiles. A step profile is one where the motion system moves rapidly from one position to another and the material is laser processed only at the end points of the motion. The path traveled between the two positions is not important to the application. Examples of step profile include laser spot welding and circuit board "via" hole drilling. In a raster profile, the motion system moves the laser beam at a fixed velocity in a repetitive manner. The material is laser processed during the linear portion of each cycle. Raster scanning is commonly used in laser printing where polygon or resonant scanner actuators provide the motion.

The vector motion profile is a common method to control motion systems in high-performance laser materials processing where a contoured pattern or shape is desired. A vector motion profile breaks the process pattern into a structured series of small steps or "microvectors" that are updated by the controller at a rate beyond the motion system's bandwidth. A vector motion profile allows the motion system to maintain a constant velocity over long straight moves. As described herein, controller 101 compensates for changes in process velocity or direction and may do that by compensating the microvectors. The controller may also change in laser "energy density" that is, the amount of laser energy applied to an area during execution of a continuous line. Existing controllers based on vector motion profiles are primarily used in high-performance laser marking of materials for identification purposes. The laser marking process does not require sophisticated set-up and has a wide process window to meet quality standards for identification purposes.

The inertia of the motion system actuators are, one example of a process non-linearity. Each actuator's inertia causes the actual position of the driver device to lag behind the desired position. The present system uses the predicted models to compensate for inertia and the associated errors in actual process position and velocity. Existing controllers usually require a technician to set by trial-and-error multiple time delay parameters that compensate for some motion system non-linearity. For example, a time delay parameter may be used to delay when the laser resonator turns on as the motion system starts accelerating at the beginning of a process pattern. Another time delay parameter is set to delay when the laser resonator turns off at the end of the pattern. Other time delay parameters delay the execution of the process pattern such as when the pattern changes direction in an attempt to improve the accuracy of the actual pattern. Settings for all of the time delay parameters are dependent on the desired process velocity setting and desired pattern geometry. If the desired process velocity is changed, the technician may reset all of the time delay parameters. In some cases, time delay parameters are insufficient and the technician must purposefully distort the process pattern to achieve an acceptable process result. This cumbersome, time-consuming method of process set-up usually results in incorrect laser energy density applied to the process material at incorrect locations.

Galvanometer scanners can produce non-linear changes in the laser beam focus due to the angular deflection of the laser beam. For flat process materials such as paper sheets, the cross-sectional area of the focused laser beam is smaller when the angular deflection is zero and large when the focused laser beam is deflected (typical 20° maximum). An increase in focus cross-sectional area of the lowers the laser energy density and increases the width of the focused beam. A lower laser energy density reduces the ability of the laser to process the material at the same process velocity and an increase in focused beam width causes an error in the shape of the process pattern. Existing controllers do not fully account for this non-linearity.

Another non-linearity is the transient laser energy levels produced when the laser resonator is initially turned on, usually at the start of a process pattern. Laser resonators commonly used in laser materials processing include carbon dioxide ($CO_2$) gas lasers ranging in laser beam output power from 50W through 5,000W. Many $CO_2$ laser resonators have a digital modulation input to vary laser power levels by adjusting modulation frequency and duty cycle. Typical modulation frequencies may range from 2 kHz to 100 kHz and duty cycles may range from 10% to 100%. The continuous power produced by the laser resonator is a function of the modulation frequency and duty cycle. Laser resonators manufactured by Coherent and Rofin-Sinar Technologies can produce energy pulses in less than 100 $\mu$sec. Some $CO_2$ laser resonators have optical delays and produce transient energy levels that may vary from well above to well below the desired level for a period of time after turn-on (<5,000 $\mu$sec). Some existing controllers have a limited compensation capability by suppressing laser energy output for a period of time after initial turn-on.

Non-linear effects from process materials include higher energy density levels usually required to initiate the desired laser process followed by lower energy density levels needed to sustain the process as the process pattern is executed. In addition, different energy density levels may be required if the thickness or type of process material changes. The present system compensates for this non-linearity.

Numerous existing controllers have been designed using real-time feedback of actual position and velocity of a low-performance laser beam motion system. These controllers use data from position detectors attached to the motion system's actuators to dynamically adjust laser power to actual process velocity. This method can perform well when process velocities are slow (<1,000 mm/second). However, these designs are limited in scale and performance bandwidth due to the use of complex sensing and active feedback techniques. Some attempts have been made to adapt this method to high-performance laser beam motion system that uses galvanometer scanners. Obtaining accurate digital feedback from a limited-rotation actuator like the galvanometer scanner is very difficult due to high signal-to-noise ratios and sensor response limitations.

Controllers based on real-time feedback also inherently lag behind the actual process, as this method repetitively samples the sensor(s), computes position and velocity errors, and then outputs the next actuator command a short time later. In addition, real-time feedback of position and velocity does not account and compensate for the numerous other process variables that must be controlled and synchronized to produce an acceptable laser materials process at high process velocities.

What is claimed is:

1. A system, comprising;
   a laser beam control part which produces first outputs that control a laser beam;
   a computer based controller, controlling said laser control part, said controller producing second outputs which are based on predictive models including at least one element of said laser beam control part, which predictive models predict how the laser beam control part will react to said second outputs, prior to said second outputs being produced;
   wherein said computer based controller includes a first controlling part optimized for controlling slower operation items, and a second controlling part, optimized for controlling faster operation parts; and
   wherein said first controlling part is a digital signal processor ("DSP"), and said second controlling part is a programmable logic device ("PLD").

2. The system as in claim 1, wherein said controller creates microvectors, each microvector representing an amount of movement which can be carried out in a cycle of operation time of said DSP.

3. A system, comprising;
   a laser beam control part which produces first outputs that control a laser beam;

a computer based controller, controlling said laser control part, said controller producing second outputs which are based on predictive models including at least one element of said laser beam control part, which predictive models predict how the laser beam control part will react to said second outputs, prior to said second outputs being produced;

wherein said computer based controller includes a first controlling part optimized for controlling slower operation items, and a second controlling part, optimized for controlling faster operation parts; and wherein said first controlling part creates microvectors, each microvector representing an amount of movement which can be carried out in a specified cycle of operation of said first controlling part.

4. The system as in claim 3, wherein said first controlling part also creates process variables, which represent a velocity of operation of the laser, and a power of the output of the laser.

5. The system as in claim 4, wherein said first controlling part creates said microvectors and said process variables based on predicted position feedback from said predictive models.

6. A system, comprising;
a laser beam control part which produces first outputs that control a laser beam;
a computer based controller, controlling said laser control part, said controller producing second outputs which are based on predictive models including at least one element of said laser beam control part, which predictive models predict how the laser beam control part will react to said second outputs, prior to said second outputs being produced; and
wherein said controller operates to determine a position difference between a current position as predicted by the model and a commanded position, determine if said position difference is greater than a specified amount, and take some action if said position is greater than said specified amount.

7. The system as in claim 6, wherein said action comprises pausing production of control signals until said position difference is no longer greater than said specified amount.

8. The system as in claim 7, wherein said controller produces signals to create a sharp corner, and said action comprises pausing production of control signals in a specified direction until the model indicates that the laser beam has reached a specified location which is different than a commanded location.

9. A system, comprising;
a laser beam control part which produces first outputs that control a laser beam;
a computer based controller, controlling said laser control part, said controller producing second outputs which are based on predictive models including at least one element of said laser beam control part, which predictive models predict how the laser beam control part will react to said second outputs, prior to said second outputs being produced; and
wherein said controller operates to determine a curve fit between a curve of a commanded trajectory profile and a predicted trajectory profile, and to determine a difference between said commanded profile and said predicted profile.

10. The system as in claim 9, wherein said controller uses said difference to determine if trajectory errors will be outside a specified range.

11. A system as in claim 9, wherein said curve fitting is carried out using least mean squares.

12. A system, comprising;
a laser beam control part which produces first outputs that control a laser beam;
a computer based controller, controlling said laser control part, said controller producing second outputs which are based an predictive models including at least one element of said laser beam control part, which predictive models predict how the laser beam control part will react to said second outputs, prior to said second outputs being produced; and
wherein said controller synchronizes said outputs with a predicted result predicted by said predictive models.

13. A method, comprising;
producing a laser output beam at different powers and locations;
producing outputs to control application of said laser output beam based on predictive models which model at least one element of hardware associated with said controlling said application of said laser beam, which predictive models predict a way that the hardware will produce said outputs prior to said outputs being produced, and
determining a curve representing a desired motion of the laser system, determining a second curve representing a motion that is predicted by said model, curve fitting said first and second curves, and adjusting said microvectors based on differences between said first and second curves.

14. The method as in claim 13, wherein said adjusting comprises determining if differences between said first and second curves are outside a predetermined tolerance, and modifying the velocity of production of said microvectors if said first and second curves are outside said predetermined tolerance.

15. A method, comprising;
producing a laser output beam at different powers and locations;
producing outputs to control application of said laser output beam based on predictive models which model at least one element of hardware associated with said controlling said application of said laser beam, which predictive models predict a way that the hardware will produce said outputs prior to said outputs being produced; and
wherein said outputs include a plurality of microvectors, each microvector representing an amount of movement to be carried out by the laser system.

16. A method, comprising;
forming a model of a laser processing system that applies laser energy to a process material according to a control signal;
using said model to predict a response of said laser processing system to said control signal; and
wherein said using comprises determining a curve fit between a commanded trajectory profile and a predicted trajectory profile as predicted by said model.

17. The method as in claim 16, further comprising using a difference between said commanded trajectory profile and said predicted trajectory profile to determine an amount of error that will exist.

18. The method as in claim 17, further comprising correcting said error when said error is predicted to be out of a specified boundary.

19. A method, comprising;

forming a model of at least one element of a system that applies a laser beam to a process material;

using said model to predict at least one of a predicted position of a laser beam motion system, an in position modification which adjusts production of laser movement commands based on real-time differences between actual and commanded positions, a trajectory optimization technique which curve fits between a commanded trajectory and a predicted trajectory that is predicted using said model and determines errors in trajectory between said commanded and predicted trajectories, command feed forward, maintaining a constant energy density application or maintaining a variable energy density application, forming an output to control a laser beam based on said predictive position; and wherein said trajectory optimization technique determines portions of the projected trajectory that are not within a specified distance of the commanded trajectory, and commands a decrease of velocity of the motion system at those portions.

20. A method, comprising:

forming a model of at least one element of a system that applies a laser beam to a process material;

using said model to predict at least one of a predicted position of a laser beam motion system, an in position modification which adjusts production of laser movement commands based on real-time differences between actual and commanded positions, a trajectory optimization technique which curve fits between a commanded trajectory and a predicted trajectory that is predicted using said model and determines errors in trajectory between said commanded and predicted trajectories, command feed forward, maintaining a constant energy density application or maintaining a variable energy density application, forming an output to control a laser beam based on said predictive position; and wherein said maintaining a constant energy density comprises using said model to calculate an amount of energy that will be applied to a unit area of a process material, and adjusting at least one of laser output and/or laser movement speed to maintain a constant amount of applied energy.

21. The method as in claim 20, wherein said model modeling information indicative of system inertia.

* * * * *